US011405636B2

(12) United States Patent
Sullivan et al.

(10) Patent No.: US 11,405,636 B2
(45) Date of Patent: Aug. 2, 2022

(54) CONDITIONAL SIGNALLING OF REFERENCE PICTURE LIST MODIFICATION INFORMATION

(71) Applicant: Microsoft Technology Licensing, LLC, Redmond, WA (US)

(72) Inventors: Gary J. Sullivan, Bellevue, WA (US); Sandeep Kanumuri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/229,649

(22) Filed: Apr. 13, 2021

(65) Prior Publication Data

US 2021/0235116 A1    Jul. 29, 2021

Related U.S. Application Data

(63) Continuation of application No. 16/727,690, filed on Dec. 26, 2019, now Pat. No. 11,012,709, which is a
(Continued)

(51) Int. Cl.
*H04N 19/00* (2014.01)
*H04N 19/58* (2014.01)
(Continued)

(52) U.S. Cl.
CPC .......... *H04N 19/58* (2014.11); *H04N 19/105* (2014.11); *H04N 19/109* (2014.11);
(Continued)

(58) Field of Classification Search
CPC ...... H04N 19/58; H04N 19/85; H04N 19/105; H04N 19/70; H04N 19/134; H04N 19/46;
(Continued)

(56) References Cited

U.S. PATENT DOCUMENTS 10,924,760 B2   2/2021   Sullivan et al.
2013/0208792 A1* 8/2013   He ...................... H04N 19/187
                                                          375/240.12
(Continued)

OTHER PUBLICATIONS

Communication Pursuant to Rules 70(2) and 70a(2) EPC dated Jun. 28, 2021, from European Patent Application No. 21155916.6, 2 pp.
(Continued)

*Primary Examiner* — Zhihan Zhou
(74) *Attorney, Agent, or Firm* — Klarquist Sparkman, LLP

(57) ABSTRACT

Innovations in signaling of reference picture list ("RPL") modification information. For example, a video encoder evaluates a condition that depends at least in part on a variable indicating a number of total reference pictures. Depending on the results of the evaluation, the encoder signals in a bitstream a flag that indicates whether an RPL is modified according to syntax elements explicitly signaled in the bitstream. A video decoder evaluates the condition and, depending on results of the evaluation, parses from a bitstream a flag that indicates whether an RPL is modified according to syntax elements explicitly signaled in the bitstream. The condition can be evaluated as part of processing for an RPL modification structure that includes the flag, or as part of processing for a slice header. The encoder and decoder can also evaluate other conditions that affect syntax elements for list entries of the RPL modification information.

20 Claims, 11 Drawing Sheets software 180 implementing one or more innovations for signaling of reference picture list modification information

Related U.S. Application Data continuation of application No. 16/191,843, filed on Nov. 15, 2018, now Pat. No. 10,560,720, which is a continuation of application No. 15/655,797, filed on Jul. 20, 2017, now Pat. No. 10,165,302, which is a continuation of application No. 15/064,299, filed on Mar. 8, 2016, now Pat. No. 9,762,928, which is a continuation of application No. 13/781,710, filed on Feb. 28, 2013, now Pat. No. 9,313,500.

(60) Provisional application No. 61/708,042, filed on Sep. 30, 2012.

(51) Int. Cl.
*H04N 19/503* (2014.01)
*H04N 19/70* (2014.01)
*H04N 19/134* (2014.01)
*H04N 19/109* (2014.01)
*H04N 19/573* (2014.01)
*H04N 19/105* (2014.01)
*H04N 19/46* (2014.01)
*H04N 19/85* (2014.01)

(52) U.S. Cl.
CPC ........... *H04N 19/134* (2014.11); *H04N 19/46* (2014.11); *H04N 19/503* (2014.11); *H04N 19/573* (2014.11); *H04N 19/70* (2014.11); *H04N 19/85* (2014.11)

(58) Field of Classification Search
CPC ... H04N 19/503; H04N 19/573; H04N 19/109
See application file for complete search history.

(56) References Cited

U.S. PATENT DOCUMENTS

| | | | | |
|---|---|---|---|---|
| 2013/0343465 | A1* | 12/2013 | Chen | H04N 19/70 375/240.24 |
| 2014/0016699 | A1* | 1/2014 | Chen | H04N 19/573 375/240.12 |
| 2014/0072031 | A1* | 3/2014 | Xiu | H04N 19/117 375/240.02 |
| 2015/0016505 | A1* | 1/2015 | Sjoberg | H04N 19/105 375/240.02 |
| 2021/0092441 | A1 | 3/2021 | Sullivan et al. | |

OTHER PUBLICATIONS

Communication under Rule 71(3) EPC dated Dec. 14, 2020, from European Patent Application No. 13774010.6, 9 pp.
Extended European Search Report dated Mar. 18, 2021, from European Patent Application No. 21155916.6, 9 pp.
Notice of Allowance dated Feb. 22, 2021, from Korean Patent Application No. 10-2020-7029591, 5 pp.
Notice of Allowance dated Sep. 23, 2021, from Korean Patent Application No. 10-2021-7015339, 4 pp.
Notice of Preliminary Rejection dated Jun. 10, 2021, from Korean Patent Application No. 10-2021-7015339, 10 pp.
Office Action dated Sep. 16, 2021, from U.S. Appl. No. 17/112,304, 26 pp.
Notice of Preliminary Rejection dated Jan. 11, 2022, from Korean Patent Application No. 10-2021-7041951, 12 pp.
Notice of Allowance dated Apr. 11, 2022, from U.S. Appl. No. 17/112,304, 10 pp.
Notice of Final Rejection dated Apr. 19, 2022, from Korean Patent Application No. 10-2021-7041951, 9 pp.

* cited by examiner software 180 implementing one or more innovations for signaling of reference picture list modification information Figure 7a                    700

| ref_pic_lists_modification( ) { | Descriptor |
|---|---|
|   if( NumPocTotalCurr > 1 ) | |
|     ref_pic_list_modification_flag_l0 | u(1) |
|   if( ref_pic_list_modification_flag_l0 ) | |
|     for( i = 0; i <= num_ref_idx_l0_active_minus1; i++ ) | |
|       list_entry_l0[ i ] | u(v) |
|   if( slice_type == B ) { | |
|     if( NumPocTotalCurr > 1 ) | |
|       ref_pic_list_modification_flag_l1 | u(1) |
|     if( ref_pic_list_modification_flag_l1 ) | |
|       for( i = 0; i <= num_ref_idx_l1_active_minus1; i++ ) | |
|         list_entry_l1[ i ] | u(v) |
|   } | |
| } | |

| slice_segment_header( ) { | Descriptor |
|---|---|
| ... | |
|     if( slice_type == P \|\| slice_type == B ) { | |
|         num_ref_idx_active_override_flag | u(1) |
|         if( num_ref_idx_active_override_flag ) { | |
|             num_ref_idx_l0_active_minus1 | ue(v) |
|             if( slice_type == B ) | |
|                 num_ref_idx_l1_active_minus1 | ue(v) |
|         } | |
|     if( list_modification_present_flag && NumPocTotalCurr > 1 ) | |
|         ref_pic_lists_modification( ) | |
| ... | |
| } | |

| ref_pic_lists_modification( ) { | Descriptor |
|---|---|
|     ref_pic_list_modification_flag_l0 | u(1) |
|     if( ref_pic_list_modification_flag_l0 ) | |
|         for( i = 0; i <= num_ref_idx_l0_active_minus1; i++ ) | |
|             list_entry_l0[ i ] | u(v) |
|     if( slice_type == B ) { | |
|         ref_pic_list_modification_flag_l1 | u(1) |
|         if( ref_pic_list_modification_flag_l1 ) | |
|             for( i = 0; i <= num_ref_idx_l1_active_minus1; i++ ) | |
|                 list_entry_l1[ i ] | u(v) |
|     } | |
| } | |

Figure 8 800

| ref_pic_lists_modification( ) { | Descriptor |
|---|---|
|   ref_pic_list_modification_flag_l0 | u(1) |
|   if( ref_pic_list_modification_flag_l0 &&<br>    !( NumPocTotalCurr = = 2 &&<br>    num_ref_idx_l0_active_minus1 = = 0 ) ) | |
|     for( i = 0; i <= num_ref_idx_l0_active_minus1; i++ ) | |
|       list_entry_l0[ i ] | u(v) |
|   if( slice_type = = B ) { | |
|     ref_pic_list_modification_flag_l1 | u(1) |
|     if( ref_pic_list_modification_flag_l1 &&<br>      !( NumPocTotalCurr = = 2 &&<br>      num_ref_idx_l1_active_minus1 = = 0 ) ) | |
|       for( i = 0; i <= num_ref_idx_l1_active_minus1; i++ ) | |
|         list_entry_l1[ i ] | u(v) |
|   } | |
| } | |

Figure 9 900

| ref_pic_lists_modification( ) { | Descriptor |
|---|---|
|   ref_pic_list_modification_flag_l0 | u(1) |
|   if( ref_pic_list_modification_flag_l0 &&<br>    !( NumPocTotalCurr = = 2 && num_ref_idx_l0_active_minus1 = = 0) &&<br>    !( NumPocTotalCurr = = 2 && num_ref_idx_l0_active_minus1 = = 1 &&<br>    ( ( weighted_pred_flag != 1 && slice_type = = P ) \|\|<br>    ( weighted_bipred_flag != 1 && slice_type = = B ) ) ) ) | |
|     for( i = 0; i <= num_ref_idx_l0_active_minus1; i++ ) | |
|       list_entry_l0[ i ] | u(v) |
|   if( slice_type = = B ) { | |
|     ref_pic_list_modification_flag_l1 | u(1) |
|     if( ref_pic_list_modification_flag_l1 &&<br>      !( NumPocTotalCurr = = 2 && num_ref_idx_l1_active_minus1 = = 0) &&<br>      !( NumPocTotalCurr = = 2 && num_ref_idx_l1_active_minus1 = = 1 &&<br>      weighted_bipred_flag != 1 ) ) | |
|       for( i = 0; i <= num_ref_idx_l1_active_minus1; i++ ) | |
|         list_entry_l1[ i ] | u(v) |
|   } | |
| } | |

CONDITIONAL SIGNALLING OF REFERENCE PICTURE LIST MODIFICATION INFORMATION

CROSS REFERENCE TO RELATED APPLICATION

This application is a continuation of U.S. patent application Ser. No. 16/727,690, filed Dec. 26, 2019, which is a continuation of U.S. patent application Ser. No. 16/191,843, filed Nov. 15, 2018, now U.S. Pat. No. 10,560,720, which is a continuation of U.S. patent application Ser. No. 15/655,797, filed Jul. 20, 2017, now U.S. Pat. No. 10,165,302, which is a continuation of U.S. patent application Ser. No. 15/064,299, filed Mar. 8, 2016, now U.S. Pat. No. 9,762,928, which is a continuation of U.S. patent application Ser. No. 13/781,710, filed Feb. 28, 2013, now U.S. Pat. No. 9,313,500, the disclosure of which is hereby incorporated by reference. U.S. patent application Ser. No. 13/781,710 claims the benefit of U.S. Provisional Patent Application No. 61/708,042, filed Sep. 30, 2012, the disclosure of which is hereby incorporated by reference.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last two decades, various video codec standards have been adopted, including the H.261, H.262 (MPEG-2 or ISO/IEC 13818-2), H.263 and H.264 (AVC or ISO/IEC 14496-10) standards and the MPEG-1 (ISO/IEC 11172-2), MPEG-4 Visual (ISO/IEC 14496-2) and SMPTE 421M standards. More recently, the HEVC standard is under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve correct results in decoding. Aside from codec standards, various proprietary codec formats define other options for the syntax of an encoded video bitstream and corresponding decoding operations.

Some types of parameters in a bitstream indicate information about reference pictures used during video encoding and decoding. A reference picture is, in general, a picture that contains samples that may be used for inter-picture prediction in the decoding process of other pictures. Typically, the other pictures follow the reference picture in decoding order and use the reference picture for motion-compensated prediction. In some video codec standards and formats, multiple reference pictures are available at a given time for use for motion-compensated prediction. Such video codec standards/formats specify how to manage the multiple reference pictures.

In general, a reference picture list ("RPL") is a list of reference pictures used for motion-compensated prediction. In some video codec standards and formats, a reference picture set ("RPS") is a set of reference pictures available for use in motion-compensated prediction at a given time, and an RPL is some of the reference pictures in the RPS. Reference pictures in an RPL are addressed with reference indices. A reference index identifies a reference picture in the RPL. During encoding and decoding, an RPS can be updated to account for newly decoded pictures and older pictures that are no longer used as reference pictures. Also, reference pictures within an RPL may be reordered such that more commonly used reference pictures are identified with reference indices that are more efficient to signal. In some recent codec standards, an RPL is constructed during encoding and decoding based upon available information about the RPS, modifications according to rules and/or modifications signaled in the bitstream. Signaling of modifications for an RPL can consume a significant amount of bits.

SUMMARY

In summary, the detailed description presents innovations in signaling of reference picture list ("RPL") modification information. More generally, the innovations relate to different ways to avoid signaling of RPL modification information when it would be unused or when values of such information can be inferred.

According to one aspect of the innovations described herein, a video encoder evaluates a condition. Depending on results of the evaluation, the encoder conditionally signals in a bitstream a flag that indicates whether an RPL is modified according to syntax elements explicitly signaled in the bitstream. A corresponding video decoder evaluates a condition. Depending on results of the evaluation, the decoder conditionally parses from a bitstream a flag that indicates whether an RPL is modified according to syntax elements explicitly signaled in the bitstream. In some example implementations, the RPL can be for a predictive ("P") slice or a bi-predictive ("B") slice. Alternatively, a higher level syntax structure is conditionally signaled/parsed based on evaluation of the condition.

In some example implementations, if the RPL is not modified, a default RPL is constructed based on rules about RPL construction from an RPS. If the RPL is modified, a replacement RPL is constructed based on signaled RPL modification information that indicates selections of reference pictures from the RPS. Alternatively, modifications to reorder a default RPL, add a reference picture to the default RPL or remove a reference picture from the default RPL are signaled in a more fine-grained way to adjust the default RPL.

For example, the condition that is evaluated depends at least in part on a variable that indicates a number of total reference pictures. In some example implementations, the condition is whether value of the variable is greater than 1.

The condition can be evaluated as part of processing for an RPL modification structure that includes the flag. Or, the condition can be evaluated as part of processing for a slice header, in which case the RPL modification structure (including the flag) is conditionally signaled or parsed depending on results of the evaluation According to another aspect of the innovations described herein, a video encoder evaluates another condition. Depending on results of the evaluation, the encoder conditionally signals in a bitstream one or more syntax elements for list entries that indicate how to modify an RPL (e.g., replace the RPL, adjust the RPL). A corresponding video decoder evaluates the condition. Depending on results of the evaluation, the decoder conditionally parses from a bitstream one or more syntax elements for list entries that indicate how to modify an RPL (e.g., replace the RPL, adjust the RPL). In some example implementations, the RPL can be for a P slice or a B slice (with the condition evaluation and conditional signaling/parsing repeated for each of multiple RPLs for a B slice). For example, the other condition depends at least in part on a variable that indicates a number of total reference pictures, a number of active reference pictures for the RPL and/or whether weighted prediction is disabled. Different logic can be used to check whether weighted prediction is disabled depending on whether a current slice is a P slice or B slice and/or depending on which RPL is being signaled/parsed. In some example implementations, if (a) the number of total reference pictures is equal to 2 and (b) the number of active reference pictures for the RPL is equal to 1, then the one or more syntax elements for list entries are absent from the bitstream, and a value is inferred for one of the list entries. Further, in some example implementations, if (c) the number of total reference pictures is equal to 2, (d) the number of active reference pictures for the RPL is equal to 2 and (e) weighted prediction is disabled, then the one or more syntax elements for list entries are absent from the bitstream, and values are inferred for two of the list entries.

According to another aspect of the innovations described herein, a video encoder evaluates another condition. Depending on results of the evaluation, the encoder adjusts signaling in a bitstream of one or more syntax elements for list entries that indicate how to modify an RPL (e.g., replace the RPL, adjust the RPL). In particular, length (in bits) of at least one of the one or more syntax elements is adjusted. A corresponding video decoder evaluates the condition. Depending on results of the evaluation, the decoder adjusts parsing from a bitstream of one or more syntax elements for list entries that indicate how to modify an RPL (again, where length (in bits) of at least one of the one or more syntax elements is adjusted). For example, the condition depends at least in part on whether weighted prediction is disabled. Different logic can be used to check whether weighted prediction is disabled depending on whether a current slice is a P slice or B slice and/or depending on which RPL is being signaled/parsed. In some example implementations, for an index i for the list entries, if weighted prediction is disabled, the length (in bits) of the at least one of the syntax elements decreases as i increases. For example, in some example implementations, if weighted prediction is disabled, the length of a given syntax element for list entry[i] is Ceil(Log 2(NumPocTotalCurr−i)) bits. On the other hand, if weighted prediction is enabled, the length of the given syntax element for list entry[i] is Ceil(Log 2(NumPocTotalCurr)) bits.

The encoding or decoding can be implemented as part of a method, as part of a computing device adapted to perform the method or as part of a tangible computer-readable media storing computer-executable instructions for causing a computing device to perform the method.

The foregoing and other objects, features, and advantages of the invention will become more apparent from the following detailed description, which proceeds with reference to the accompanying figures.

BRIEF DESCRIPTION OF THE DRAWINGS

FIG. 7a is a table illustrating conditional signaling of a flag that indicates whether an RPL is modified, according to some example implementations.

FIGS. 7b and 7c are tables illustrating conditional signaling of one or more flags that indicate whether an RPL is modified, according to other example implementations.

FIGS. 8 and 9 are tables illustrating conditional signaling of syntax elements for list entries that indicate how to modify an RPL, according to some example implementations.

DETAILED DESCRIPTION

Figure 1:
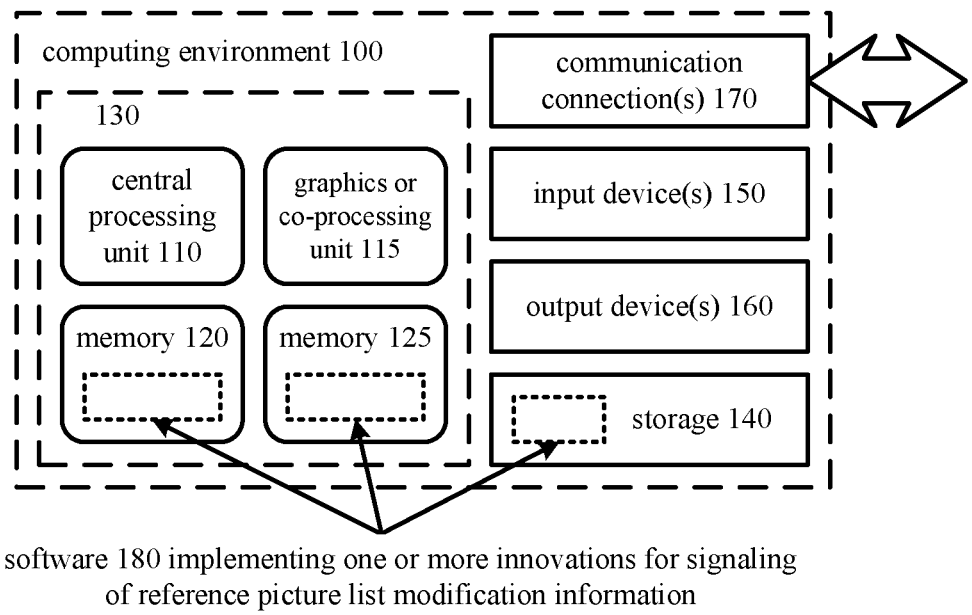
FIG. 1 is a diagram of an example computing system in which some described embodiments can be implemented.

The detailed description presents innovations in signaling of reference picture list ("RPL") modification information. These innovations can help avoid the signaling of RPL modification information when it would be unused or when values of such information can be inferred.

In some recent codec standards, a reference picture set ("RPS") is a set of reference pictures available for use in motion-compensated prediction, and an RPL is constructed from the RPS. For the decoding process of a predictive ("P") slice, there is one RPL, which is called RPL 0. For the decoding process of a bi-predictive ("B") slice, there are two RPLs, which are called RPL 0 and RPL 1. At the beginning of the decoding process for a P slice, RPL 0 is derived from available information about RPL 0 (such as the set of reference pictures available at the decoder for decoding of the current picture), modifications according to rules and/or modifications signaled in the bitstream. Similarly, at the beginning of the decoding process for a B slice, RPL 0 and RPL 1 are derived from available information about RPL 0 and available information about RPL 1 (such as the set of reference pictures available at the decoder for decoding of the current picture), modifications according to rules and/or modifications signaled in the bitstream. More generally, an RPL is constructed during encoding and decoding based upon available information about the RPL, modifications according to rules and/or modifications signaled in the bitstream. Signaling of modifications for an RPL can consume a significant amount of bits. For some recent codec standards, there are inefficiencies in how RPL modification information is signaled.

The detailed description presents various innovations in the area of signaling of RPL modification information. In some situations, these innovations result in more efficient signaling of syntax elements for RPL modification information. For example, the detailed description describes conditional signaling of syntax elements for list entries that indicate how to modify an RPL. The detailed description also describes ways to use fewer bits to signal such syntax elements. As another example, the detailed description describes conditional signaling of a flag that indicates whether an RPL is modified.

In some example implementations, if the RPL is not modified, a default RPL is constructed according to an "implicit" approach using rules about RPL construction from an RPS. If the RPL is modified, a replacement RPL is constructed according to an "explicit" signaling approach using signaled RPL modification information that indicates selections of reference pictures from the RPS. Alternatively, modifications to reorder, add a reference picture or remove a reference picture from a default RPL can be signaled in a more fine-grained way as specific changes relative to the default RPL.

Some of the innovations described herein are illustrated with reference to syntax elements and operations specific to the HEVC standard. For example, reference is made to the draft version JCTVC-I1003 of the HEVC standard—"High efficiency video coding (HEVC) text specification draft 7", JCTVC-I1003_d5, 9$^{th}$ meeting of the Joint Collaborative Team on Video Coding ("JCT-VC"), Geneva, April 2012. See also the draft version entitled, "High Efficiency Video Coding (HEVC) text specification draft 9," JCTVC-K1003_d11, 11$^{th}$ meeting of the JCT-VC, Shanghai, October 2012. The innovations described herein can also be implemented for other standards or formats.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). In FIG. 1, this most basic configuration (130) is included within a dashed line. The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for signaling of RPL modification information, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for signaling of RPL modification information.

The input device(s) (150) may be a touch input device such as a keyboard, mouse, pen, or trackball, a voice input device, a scanning device, or another device that provides input to the computing system (100). For video encoding, the input device(s) (150) may be a camera, video card, TV tuner card, or similar device that accepts video input in analog or digital form, or a CD-ROM or CD-RW that reads video samples into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an application specific integrated circuit ("ASIC") (such as an ASIC digital signal process unit ("DSP"), a graphics processing unit ("GPU"), or a programmable logic device ("PLD"), such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
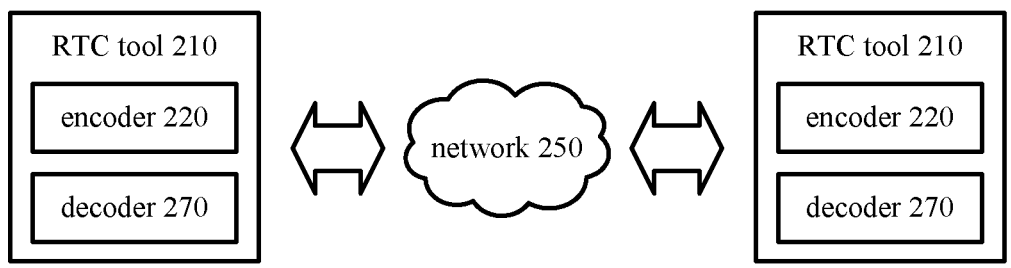
FIGS. 2a and 2b are diagrams of example network environments in which some described embodiments can be implemented.
Figure 2B:
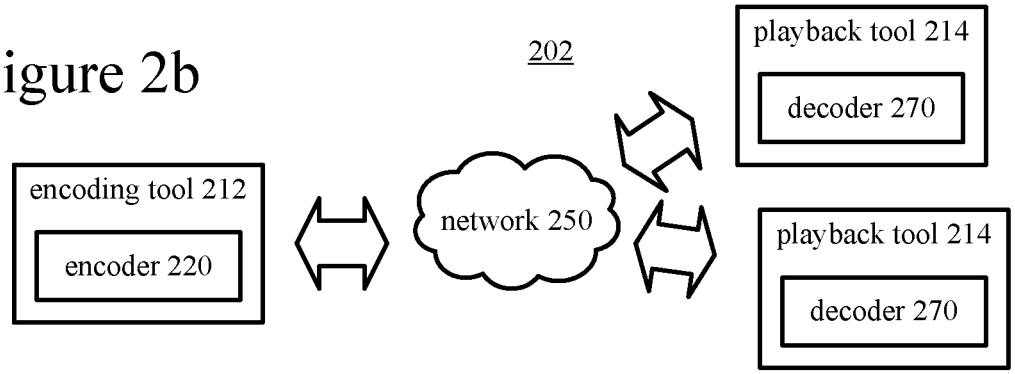

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the SMPTE 421M standard, ISO-IEC 14496-10 standard (also known as H.264 or AVC), HEVC standard, another standard, or a proprietary format, with a corresponding decoder (270) accepting encoded data from the encoder (220). The bidirectional communication can be part of a video conference, video telephone call, or other two-party communication scenario. Although the network environment (201) in FIG. 2a includes two real-time communication tools (210), the network environment (201) can instead include three or more real-time communication tools (210) that participate in multi-party communication.

Figure 3:
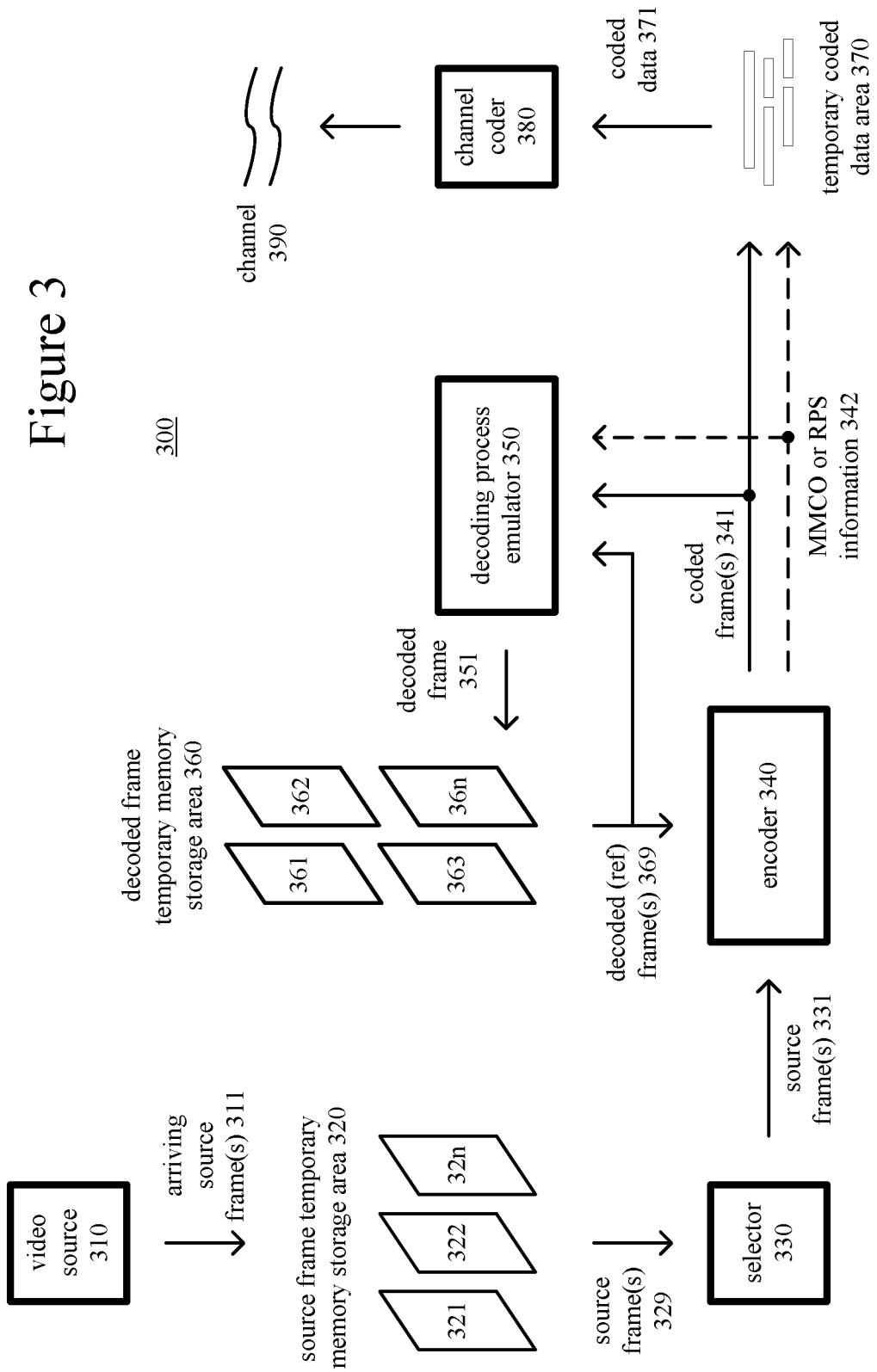
FIG. 3 is a diagram of an example encoder system in conjunction with which some described embodiments can be implemented.
Figure 4:
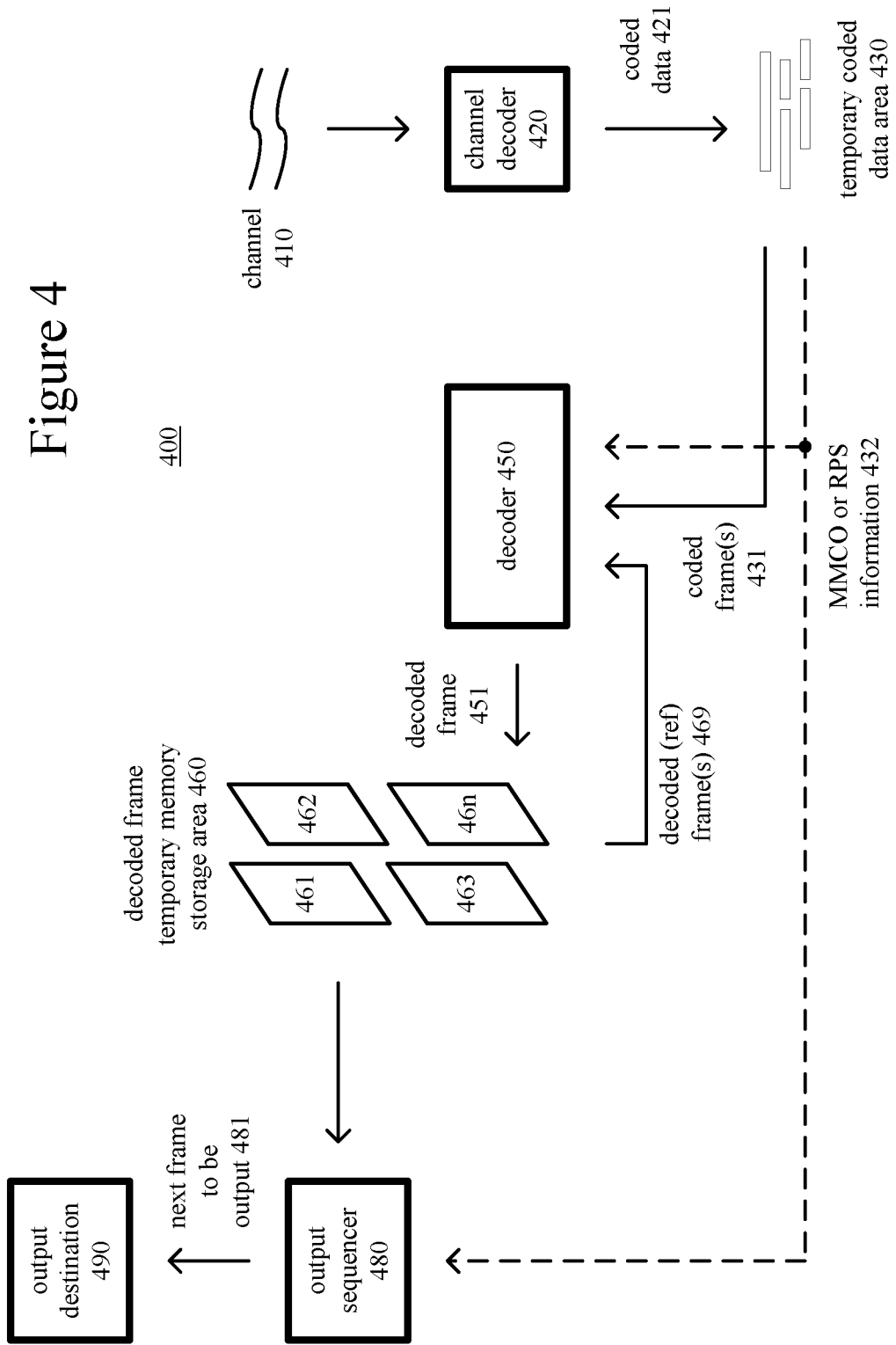
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, transcoding mode, and regular encoding mode for media playback from a file or stream, or it can be a special-purpose encoding tool adapted for one such encoding mode. The encoder system (300) can be implemented as an operating system module, as part of an application library or as a standalone application. Overall, the encoder system (300) receives a sequence of source video frames (311) from a video source (310) and produces encoded data as output to a channel (390). The encoded data output to the channel can include syntax elements that indicate RPL modification information.

The video source (310) can be a camera, tuner card, storage media, or other digital video source. The video source (310) produces a sequence of video frames at a frame rate of, for example, 30 frames per second. As used herein, the term "frame" generally refers to source, coded or reconstructed image data. For progressive video, a frame is a progressive video frame. For interlaced video, in example embodiments, an interlaced video frame is de-interlaced prior to encoding. Alternatively, two complementary interlaced video fields are encoded as an interlaced video frame or separate fields. Aside from indicating a progressive video frame, the term "frame" or "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source frame (311) is stored in a source frame temporary memory storage area (320) that includes multiple frame buffer storage areas (321, 322, . . . , 32n). A frame buffer (321, 322, etc.) holds one source frame in the source frame storage area (320). After one or more of the source frames (311) have been stored in frame buffers (321, 322, etc.), a frame selector (330) periodically selects an individual source frame from the source frame storage area (320). The order in which frames are selected by the frame selector (330) for input to the encoder (340) may differ from the order in which the frames are produced by the video source (310), e.g., a frame may be ahead in order, to facilitate temporally backward prediction. Before the encoder (340), the encoder system (300) can include a pre-processor (not shown) that performs pre-processing (e.g., filtering) of the frames before encoding. The pre-processing can also include color space conversion into primary and secondary components for encoding.

The encoder (340) encodes the selected frame (331) to produce a coded frame (341) and also produces memory management control operation ("MMCO") signals (342) or reference picture set ("RPS") information. If the current frame is not the first frame that has been encoded, when performing its encoding process, the encoder (340) may use one or more previously encoded/decoded frames (369) that have been stored in a decoded frame temporary memory storage area (360). Such stored decoded frames (369) are used as reference pictures for inter-frame prediction of the content of the current source frame (331). Generally, the encoder (340) includes multiple encoding modules that perform encoding tasks such as motion estimation and compensation, frequency transforms, quantization and entropy coding. The exact operations performed by the encoder (340) can vary depending on compression format. The format of the output encoded data can be a Windows Media Video format, VC-1 format, MPEG-x format (e.g., MPEG-1, MPEG-2, or MPEG-4), H.26x format (e.g., H.261, H.262, H.263, H.264), HEVC format or other format.

For example, within the encoder (340), an inter-coded, predicted frame is represented in terms of prediction from reference frames, which are examples of reference pictures. A motion estimator estimates motion of blocks or other sets of samples of a source frame (341) with respect to one or more reference frames (369). When multiple reference frames are used, the multiple reference frames can be from different temporal directions or the same temporal direction. The reference frames (reference pictures) can be part of one or more RPLs, with reference indices addressing the reference pictures in the RPL(s). RPL(s) are constructed during encoding so that new reference pictures are added when appropriate, older reference pictures that are no longer used for motion compensation are removed when appropriate, and reference pictures are reordered when appropriate. In some implementations, for example, when encoding a current picture, the encoder (340) determines an RPS that includes reference pictures in the decoded frame storage area (360), then creates one or more RPLs for encoding of a given slice of the current picture. An RPL can be created by applying rules about the selection of reference pictures available from the RPS (implicit approach), in which case RPL modification information is not explicitly signaled in the bitstream. Or, the RPL can be created by selecting specific reference pictures available from the RPS, where the reference pictures that are selected will be indicated in RPL modification information that is signaled in the bitstream. Compared to an RPL that would be constructed by rules of the implicit approach, the RPL modification information can specify a replacement RPL as a list of reference pictures in the RPS. Alternatively, the RPL modification information can, in a more fine-grained way, specify removal of one or more reference pictures, addition of one or more reference pictures and/or reordering of reference pictures in the RPL constructed by rules of the implicit approach.

When encoding an inter-coded frame, the encoder (340) can evaluate the results of motion compensation for which an RPL is not modified according to syntax elements explicitly signaled in the bitstream, and also evaluate the results of motion compensation for which the RPL is modified according to syntax elements explicitly signaled in the bitstream (or results of multiple different ways of modifying the RPL). The encoder (340) can decide to use the default RPL (no RPL modification information signaled in the bitstream) or a modified RPL (with RPL modification information signaled in the bitstream). When the RPL is modified (e.g., replaced, adjusted), compared to the default RPL, the encoder (340) can perform one or more of (a) reordering reference pictures for more efficient addressing with reference indices, (b) removing reference pictures based at least in part on frequency of use during encoding, and (c) adding reference pictures based at least in part on frequency of use during encoding. For example, the encoder (340) can decide to remove a given reference picture from the RPL after utilization of the reference picture for motion compensation falls below a threshold amount and/or according to other criteria. As another example, the encoder (340) can decide to add a given reference picture to the RPL if utilization of the reference picture for motion compensation is above a threshold amount and/or according to other criteria. As another example, the encoder (340) can decide how to reorder reference pictures in the RPL based on frequency of utilization of the respective reference pictures and/or according to other criteria.

The motion estimator outputs motion information such as motion vector information, which is entropy coded. A motion compensator applies motion vectors to reference pictures to determine motion-compensated prediction values. The encoder determines the differences (if any) between a block's motion-compensated prediction values and corresponding original values. These prediction residual values are further encoded using a frequency transform, quantization and entropy encoding. Similarly, for intra prediction, the encoder (340) can determine intra-prediction values for a block, determine prediction residual values, and encode the prediction residual values (with a frequency transform, quantization and entropy encoding). In particular, the entropy coder of the encoder (340) compresses quantized transform coefficient values as well as certain side information (e.g., motion vector information, QP values, mode decisions, parameter choices, reference indices, RPL modification information). Typical entropy coding techniques include Exp-Golomb coding, arithmetic coding, differential coding, Huffman coding, run length coding, variable-length-to-variable-length ("V2V") coding, variable-length-to-fixed-length ("V2F") coding, LZ coding, dictionary coding, probability interval partitioning entropy coding ("PIPE"), and combinations of the above. The entropy coder can use different coding techniques for different kinds of information, and can choose from among multiple code tables within a particular coding technique.

The coded frames (341) and MMCO/RPS information (342) are processed by a decoding process emulator (350). The decoding process emulator (350) implements some of the functionality of a decoder, for example, decoding tasks to reconstruct reference pictures that are used by the encoder (340) in motion compensation. The decoding process emulator (350) uses the MMCO/RPS information (342) to determine whether a given coded frame (341) needs to be reconstructed and stored for use as a reference picture in inter-frame prediction of subsequent frames to be encoded. If the MMCO/RPS information (342) indicates that a coded frame (341) needs to be stored, the decoding process emulator (350) models the decoding process that would be conducted by a decoder that receives the coded frame (341) and produces a corresponding decoded frame (351). In doing so, when the encoder (340) has used decoded frame(s) (369) that have been stored in the decoded frame storage area (360), the decoding process emulator (350) also uses the decoded frame(s) (369) from the storage area (360) as part of the decoding process.

The decoded frame temporary memory storage area (360) includes multiple frame buffer storage areas (361, 362, . . . , 36n). The decoding process emulator (350) uses the MMCO/RPS information (342) to manage the contents of the storage area (360) in order to identify any frame buffers (361, 362, etc.) with frames that are no longer needed by the encoder (340) for use as reference pictures. After modeling the decoding process, the decoding process emulator (350) stores a newly decoded frame (351) in a frame buffer (361, 362, etc.) that has been identified in this manner.

The coded frames (341) and MMCO/RPS information (342) are also buffered in a temporary coded data area (370). The coded data that is aggregated in the coded data area (370) can contain, as part of the syntax of an elementary coded video bitstream, syntax elements that indicate RPL modification information. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) are processed by a channel encoder (380). The channel encoder (380) can packetize the aggregated data for transmission as a media stream (e.g., according to a media container format such as ISO/IEC 14496-12), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and regular decoding mode for media playback from a file or stream, or it can be a special-purpose decoding tool adapted for one such decoding mode. The decoder system (400) can be implemented as an operating system module, as part of an application library or as a standalone application. Overall, the decoder system (400) receives coded data from a channel (410) and produces reconstructed frames as output for an output destination (490). The coded data can include syntax elements that indicate RPL modification information.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes data that has been aggregated for transmission as a media stream (e.g., according to a media container format such as ISO/IEC 14496-12), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s).

The coded data (421) that is output from the channel decoder (420) is stored in a temporary coded data area (430) until a sufficient quantity of such data has been received. The coded data (421) includes coded frames (431) and MMCO/RPS information (432). The coded data (421) in the coded data area (430) can contain, as part of the syntax of an elementary coded video bitstream, syntax elements that indicate RPL modification information. The coded data (421) in the coded data area (430) can also include media metadata relating to the encoded video data (e.g., as one or more parameters in one or more SEI messages or VUI messages). In general, the coded data area (430) temporarily stores coded data (421) until such coded data (421) is used by the decoder (450). At that point, coded data for a coded frame (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) periodically decodes a coded frame (431) to produce a corresponding decoded frame (451). As appropriate, when performing its decoding process, the decoder (450) may use one or more previously decoded frames (469) as reference frames (reference pictures) for inter-frame prediction. The decoder (450) reads such previously decoded frames (469) from a decoded frame temporary memory storage area (460). Generally, the decoder (450) includes multiple decoding modules that perform decoding tasks such as entropy decoding, inverse quantization, inverse frequency transforms and motion compensation (which can create RPL(s) using RPL modification information). The exact operations performed by the decoder (450) can vary depending on compression format.

For example, the decoder (450) receives encoded data for a compressed frame or sequence of frames and produces output including decoded frame (451). In the decoder (450), a buffer receives encoded data for a compressed frame and makes the received encoded data available to an entropy decoder. The entropy decoder entropy decodes entropy-coded quantized data as well as entropy-coded side information (including reference indices, RPL modification information, etc.), typically applying the inverse of entropy encoding performed in the encoder. The decoder constructs one or more RPLs for reference pictures, with reference indices addressing the reference pictures in the RPL(s). The RPL(s) are constructed so that new reference pictures are added when appropriate, older reference pictures that are no longer used for motion compensation are removed when appropriate, and reference pictures are reordered when appropriate. In some implementations, for example, when decoding a current picture, the decoder (450) determines an RPS that includes reference pictures in the decoded frame storage area (460), then creates one or more RPLs for decoding of a given slice of the current picture. An RPL can be created by applying rules about the selection of reference pictures available from the RPS, in which case RPL modification information is not parsed from the bitstream. Or, the RPL can be created by selecting specific reference pictures available from the RPS, where the reference pictures that are selected are indicated in RPL modification information that is parsed from the bitstream. Compared to an RPL that would be constructed by rules of the implicit approach, the RPL modification information can specify a replacement RPL as a list of reference pictures in the RPS. Alternatively, the RPL modification information can, in a more fine-grained way, specify removal of one or more reference pictures, addition of one or more reference pictures and/or reordering of reference pictures in the RPL constructed by rules of the implicit approach.

A motion compensator applies motion information to one or more reference pictures to form motion-compensated predictions of sub-blocks and/or blocks (generally, blocks) of the frame being reconstructed. An intra prediction module can spatially predict sample values of a current block from neighboring, previously reconstructed sample values. The decoder (450) also reconstructs prediction residuals. An inverse quantizer inverse quantizes entropy-decoded data. An inverse frequency transformer converts the reconstructed frequency domain data into spatial domain information. For a predicted frame, the decoder (450) combines reconstructed prediction residuals with motion-compensated predictions to form a reconstructed frame. The decoder (450) can similarly combine prediction residuals with spatial predictions from intra prediction. A motion compensation loop in the video decoder (450) includes an adaptive de-blocking filter to smooth discontinuities across block boundary rows and/or columns in the decoded frame (451).

The decoded frame temporary memory storage area (460) includes multiple frame buffer storage areas (461, 462, . . . , 46n). The decoded frame storage area (460) is an example of a DPB. The decoder (450) uses the MMCO/RPS information (432) to identify a frame buffer (461, 462, etc.) in which it can store a decoded frame (451). The decoder (450) stores the decoded frame (451) in that frame buffer.

An output sequencer (480) uses the MMCO/RPS information (432) to identify when the next frame to be produced in output order is available in the decoded frame storage area (460). When the next frame (481) to be produced in output order is available in the decoded frame storage area (460), it is read by the output sequencer (480) and output to the output destination (490) (e.g., display). In general, the order in which frames are output from the decoded frame storage area (460) by the output sequencer (480) may differ from the order in which the frames are decoded by the decoder (450).

V. Example Video Encoders.

Figure 5:
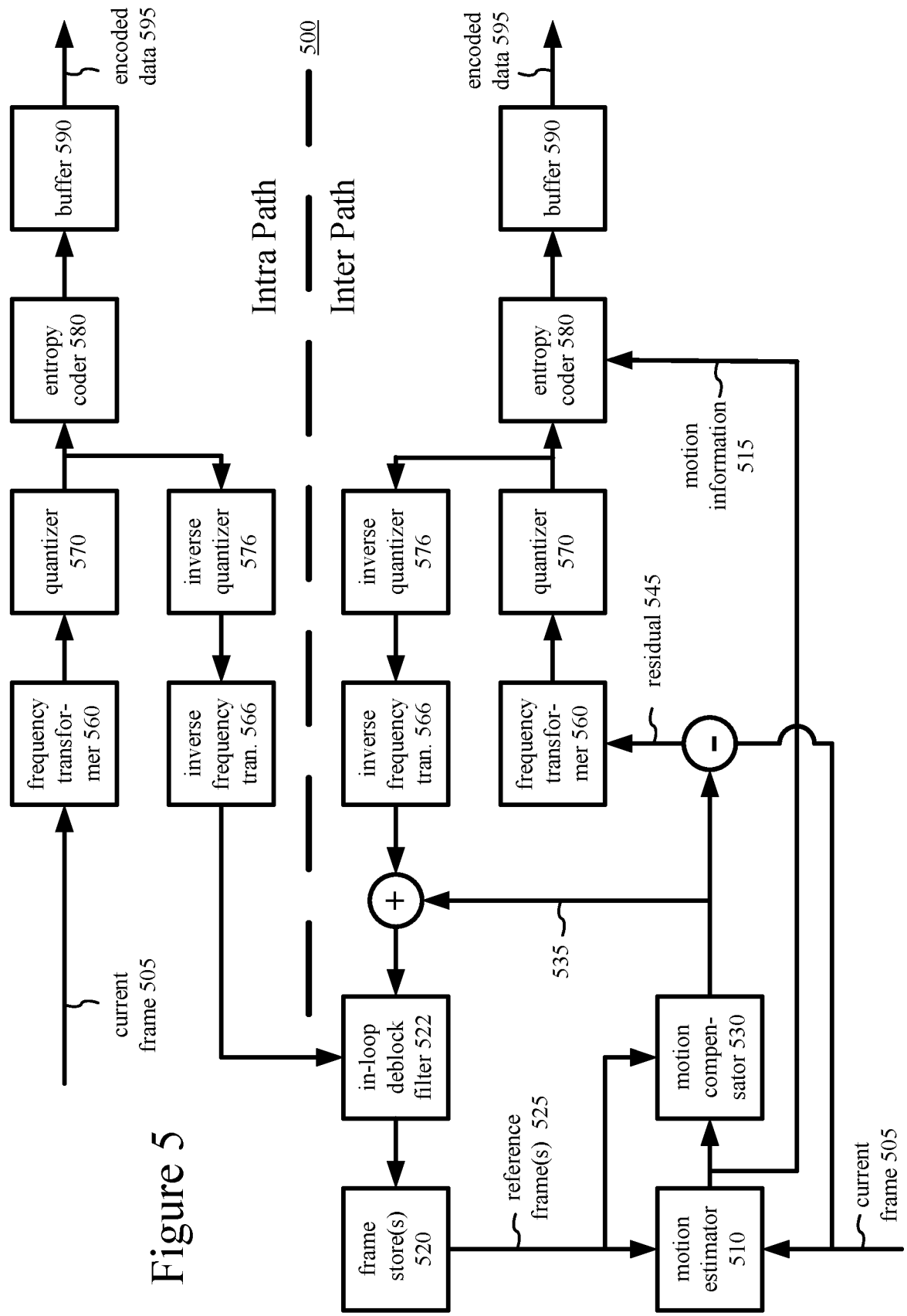
FIG. 5 is a diagram illustrating an example video encoder in conjunction with which some described embodiments can be implemented.

FIG. 5 is a block diagram of a generalized video encoder (500) in conjunction with which some described embodiments may be implemented. The encoder (500) receives a sequence of video frames including a current frame (505) and produces encoded data (595) as output.

The encoder (500) is block-based and uses a block format that depends on implementation. Blocks may be further sub-divided at different stages, e.g., at the frequency transform and entropy encoding stages. For example, a frame can be divided into 64×64 blocks, 32×32 blocks or 16×16 blocks, which can in turn be divided into smaller blocks and sub-blocks of pixel values for coding and decoding.

The encoder system (500) compresses predicted frames and intra-coded frames. For the sake of presentation, FIG. 5 shows an "intra path" through the encoder (500) for intra-frame coding and an "inter path" for inter-frame coding. Many of the components of the encoder (500) are used for both intra-frame coding and inter-frame coding. The exact operations performed by those components can vary depending on the type of information being compressed.

If the current frame (505) is a predicted frame, a motion estimator (510) estimates motion of blocks, sub-blocks or other sets of pixel values of the current frame (505) with respect to one or more reference frames (reference pictures). The frame store (520) buffers one or more reconstructed previous frames (525) for use as reference frames (reference pictures). When multiple reference pictures are used, the multiple reference pictures can be from different temporal directions or the same temporal direction. The multiple reference pictures can be represented in one or more RPLs, which are addressed with reference indices. The motion estimator (510) outputs as side information motion information (515) such as differential motion vector information, reference indices and RPL modification information. During encoding, the encoder (500) constructs RPL(s) so that new reference pictures are added when appropriate, older reference pictures that are no longer used for motion compensation are removed when appropriate, and reference pictures are reordered in the RPL(s) when appropriate.

In some implementations, when encoding a current frame, the encoder (500) determines an RPS that includes reference frames in the frame store (520). The encoder (500) typically determines the RPS for the first slice of the frame. On a slice-by-slice basis, the encoder (500) creates one or more RPLs for encoding of a given slice of the current frame. To create an RPL, the encoder (500) can apply rules about the selection of reference frames available from the RPS, in which case RPL modification information is not explicitly signaled in the encoded data (595). Or, to create the RPL, the encoder (500) can select specific reference frames available from the RPS, where the reference frames that are selected will be indicated in RPL modification information that is signaled in the encoded data (595). Compared to an RPL that would be constructed by rules of the implicit approach, the RPL modification information can specify a replacement RPL as a list of reference pictures in the RPS. Alternatively, the RPL modification information can, in a more fine-grained way, specify removal of one or more reference frames, addition of one or more reference frames and/or reordering of reference frames in the RPL implicitly constructed by rules.

The motion compensator (530) applies reconstructed motion vectors to the reconstructed reference frame(s) (525) when forming a motion-compensated current frame (535). The difference (if any) between a sub-block, block, etc. of the motion-compensated current frame (535) and corresponding part of the original current frame (505) is the prediction residual (545) for the sub-block, block, etc. During later reconstruction of the current frame, reconstructed prediction residuals are added to the motion-compensated current frame (535) to obtain a reconstructed frame that is closer to the original current frame (505). In lossy compression, however, some information is still lost from the original current frame (505). The intra path can include an intra prediction module (not shown) that spatially predicts pixel values of a current block or sub-block from neighboring, previously reconstructed pixel values.

A frequency transformer (560) converts spatial domain video information into frequency domain (i.e., spectral, transform) data. For block-based video frames, the frequency transformer (560) applies a discrete cosine transform, an integer approximation thereof, or another type of forward block transform to blocks or sub-blocks of pixel value data or prediction residual data, producing blocks/sub-blocks of frequency transform coefficients. A quantizer (570) then quantizes the transform coefficients. For example, the quantizer (570) applies non-uniform, scalar quantization to the frequency domain data with a step size that varies on a frame-by-frame basis, slice-by-slice basis, block-by-block basis or other basis.

When a reconstructed version of the current frame is needed for subsequent motion estimation/compensation, an inverse quantizer (576) performs inverse quantization on the quantized frequency coefficient data. An inverse frequency transformer (566) performs an inverse frequency transform, producing blocks/sub-blocks of reconstructed prediction residuals or pixel values. For a predicted frame, the encoder (500) combines reconstructed prediction residuals (545) with motion-compensated predictions (535) to form the reconstructed frame (505), which may be used as a reference picture. (Although not shown in FIG. 5, in the intra path, the encoder (500) can combine prediction residuals with spatial predictions from intra prediction to reconstruct a frame that is used as a reference picture.) The frame store (520) buffers the reconstructed current frame for use as a reference picture in subsequent motion-compensated prediction.

A motion compensation loop in the encoder (500) includes an adaptive in-loop deblock filter (510) before or after the frame store (520). The decoder (500) applies in-loop filtering to reconstructed frames to adaptively smooth discontinuities across boundaries in the frames.

The entropy coder (580) compresses the output of the quantizer (570) as well as motion information (515) and certain side information (e.g., QP values, reference indices, RPL modification information). The entropy coder (580) provides encoded data (595) to the buffer (590), which multiplexes the encoded data into an output bitstream. The encoded data (595) can include syntax elements that indicate RPL modification information. Section VII describes examples of such syntax elements.

A controller (not shown) receives inputs from various modules of the encoder. The controller evaluates intermediate results during encoding, for example, setting QP values and performing rate-distortion analysis. The controller works with other modules to set and change coding parameters during encoding. In particular, when deciding whether and how to modify (e.g., replace, adjust) RPL(s), the controller can control which reference pictures are added to RPL(s), control which picture are removed from RPL(s), and reorder reference pictures in RPL(s) for more efficient addressing with reference indices. The controller can decide to remove reference pictures from the RPS (and hence RPLs), for example, by removing all reference pictures after a scene change, removing all reference pictures after encoding of a special kind of picture such as an IDR picture, removing a given reference picture after utilization of the reference picture for motion compensation falls below a threshold amount and/or removing reference pictures according to other criteria. The controller can decide to add reference pictures to the RPS, for example, by adding pictures according to picture type/slice types in the pictures, temporal layer for the pictures and/or other criteria. For an RPL, the controller can evaluate the results of motion compensation for which an RPL is not modified according to syntax elements explicitly signaled in the bitstream, and also evaluate the results of motion compensation for which the RPL is modified according to syntax elements explicitly signaled in the bitstream (or results of multiple different ways of modifying the RPL). The controller can evaluate results in terms of bitrate and/or quality. The controller can select the RPL implicitly constructed by rules (no RPL modification information) or select an RPL that has been modified (as specified with RPL modification information). To modify (e.g., replace, adjust) an RPL, compared to the implicitly constructed RPL, the controller can (a) reorder reference pictures for more efficient addressing with reference indices, (b) remove reference pictures based at least in part on frequency of use during encoding, and/or (c) add reference pictures based at least in part on frequency of use during encoding. For example, the controller can decide to remove a given reference picture from the RPL after utilization of the reference picture for motion compensation falls below a threshold amount and/or according to other criteria. Or, the controller can decide to add a given reference picture to the RPL if utilization of the reference picture for motion compensation is above a threshold amount and/or according to other criteria. Or, the controller can decide how to reorder reference pictures in the RPL based on frequency of utilization of the respective reference pictures and/or according to other criteria. The controller can construct the RPL(s) on a picture-by-picture basis, slice-by-slice basis, or some other basis.

Depending on implementation and the type of compression desired, modules of the encoder can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

Figure 6:
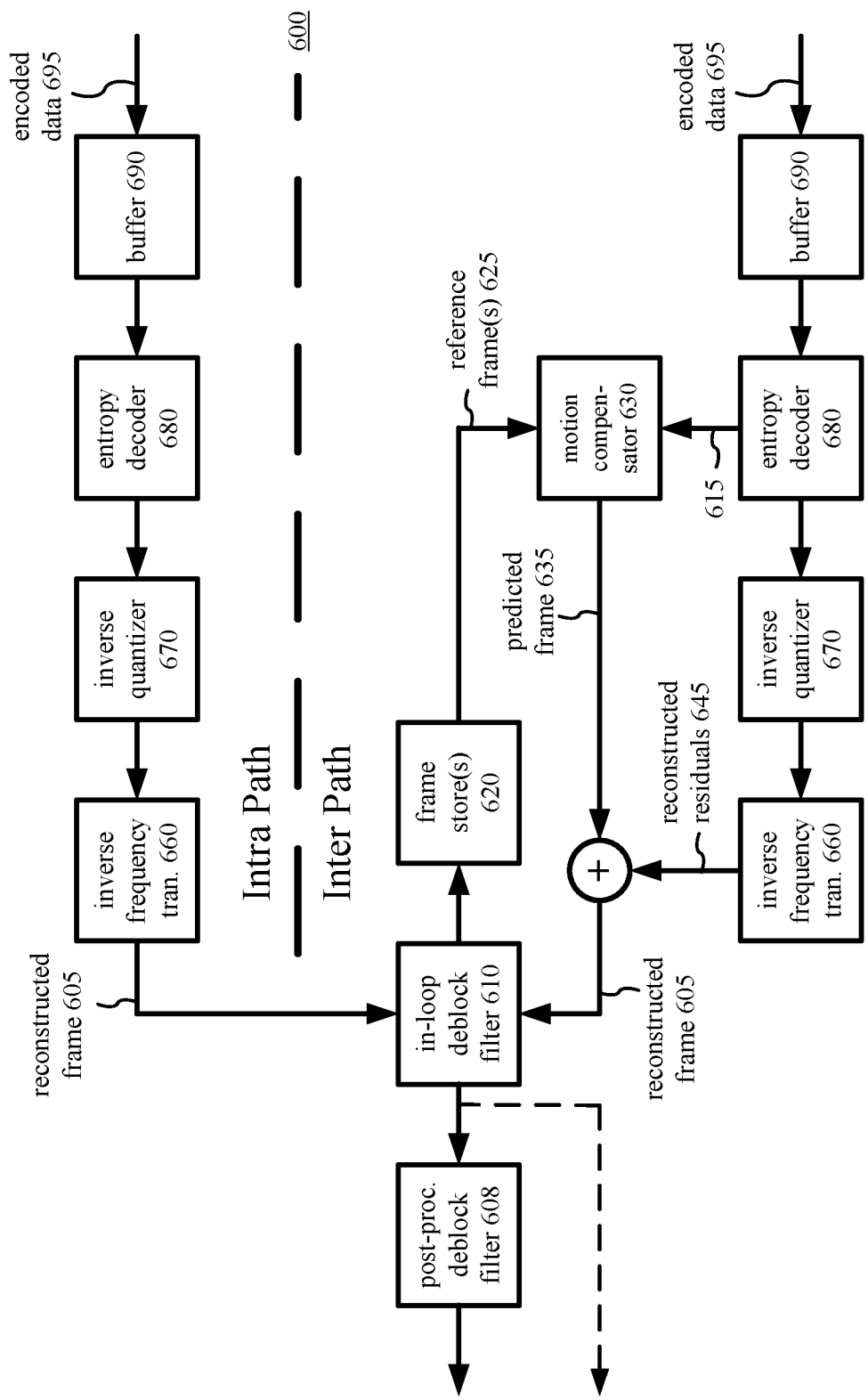
FIG. 6 is a diagram illustrating an example video decoder in conjunction with which some described embodiments can be implemented.

FIG. 6 is a block diagram of a generalized decoder (600) in conjunction with which several described embodiments may be implemented. The decoder (600) receives encoded data (695) for a compressed frame or sequence of frames and produces output including a reconstructed frame (605), which may be used as a reference picture. For the sake of presentation, FIG. 6 shows an "intra path" through the decoder (600) for intra-frame decoding and an "inter path" for inter-frame decoding. Many of the components of the decoder (600) are used for both intra-frame decoding and inter-frame decoding. The exact operations performed by those components can vary depending on the type of information being decompressed.

A buffer (690) receives encoded data (695) for a compressed frame and makes the received encoded data available to the parser/entropy decoder (680). The encoded data (695) can include syntax elements that indicate RPL modification information. Section VII describes examples of such syntax elements. The parser/entropy decoder (680) entropy decodes entropy-coded quantized data as well as entropy-coded side information (including reference indices, RPL modification information, etc.), typically applying the inverse of entropy encoding performed in the encoder.

During decoding, the decoder (600) constructs RPL(s) so that new reference pictures are added when appropriate, older reference pictures that are no longer used for motion compensation are removed when appropriate, and reference pictures are reordered when appropriate. The decoder (600) can construct the RPL(s) based upon available information about the RPL(s) (e.g., available reference pictures in the RPS), modifications according to rules and/or according to modifications signaled as part of the encoded data (695). In some implementations, for example, when decoding a current frame, the decoder (600) determines an RPS that includes reference frames in the frame store (620). The decoder (600) typically determines the RPS for the first slice of the frame. On a slice-by-slice basis, the decoder (600) creates one or more RPLs for decoding of a given slice of the current frame. To create an RPL, in some cases (as indicated in the encoded data (695)), the decoder (600) applies rules about the selection of reference frames available from the RPS, in which case RPL modification information is not parsed from the encoded data (695). In other cases, to create the RPL, the decoder (600) selects specific reference frames available from the RPS, where the reference frames that are selected are indicated in RPL modification information that is parsed from the encoded data (695). The RPL modification information can specify a replacement RPL as a list of reference pictures in the RPS. Alternatively, the RPL modification information can, in a more fine-grained way, specify removal of one or more reference frames, addition of one or more reference frames and/or reordering of reference frames in the RPL implicitly constructed by rules.

A motion compensator (630) applies motion information (615) to one or more reference pictures (625) to form motion-compensated predictions (635) of sub-blocks and/or blocks of the frame (605) being reconstructed. The frame store (620) stores one or more previously reconstructed frames for use as reference pictures.

The intra path can include an intra prediction module (not shown) that spatially predicts pixel values of a current block or sub-block from neighboring, previously reconstructed pixel values. In the inter path, the decoder (600) reconstructs prediction residuals. An inverse quantizer (670) inverse quantizes entropy-decoded data. An inverse frequency transformer (660) converts the reconstructed frequency domain data into spatial domain information. For example, the inverse frequency transformer (660) applies an inverse block transform to frequency transform coefficients, producing pixel value data or prediction residual data. The inverse frequency transform can be an inverse discrete cosine transform, an integer approximation thereof, or another type of inverse frequency transform.

For a predicted frame, the decoder (600) combines reconstructed prediction residuals (645) with motion-compensated predictions (635) to form the reconstructed frame (605), which may be used as a reference picture. (Although not shown in FIG. 6, in the intra path, the decoder (600) can combine prediction residuals with spatial predictions from intra prediction to reconstruct a frame, which may be used as a reference picture.) A motion compensation loop in the decoder (600) includes an adaptive in-loop deblock filter (610) before or after the frame store (620). The decoder (600) applies in-loop filtering to reconstructed frames to adaptively smooth discontinuities across boundaries in the frames.

In FIG. 6, the decoder (600) also includes a post-processing deblock filter (608). The post-processing deblock filter (608) optionally smoothes discontinuities in reconstructed frames. Other filtering (such as de-ring filtering) can also be applied as part of the post-processing filtering.

Depending on implementation and the type of decompression desired, modules of the decoder can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Signaling of Reference Picture List Modification Information.

This section presents various innovations in the area of signaling of RPL modification information. In some situations, these innovations result in more efficient signaling of syntax elements for RPL modification information.

A. Reference Pictures and RPLs.

A reference picture is, in general, a picture that contains samples that may be used for inter-picture prediction in the decoding process of other pictures, which typically follow the reference picture in decoding order. Multiple reference pictures may be available at a given time for use for motion-compensated prediction.

In general, a reference picture list ("RPL") is a list of reference pictures used for motion-compensated prediction. Reference pictures in the RPL are addressed with reference indices. A reference index identifies a reference picture in the RPL. During encoding and decoding, when an RPL is constructed, reference pictures in the RPL can change from time to time to add newly decoded pictures, drop older pictures that are no longer used as reference pictures and/or reorder reference pictures within the RPL to make signaling of the more commonly used reference indices more efficient. An encoder and decoder can follow the same rules to construct, modify, etc. their RPL(s). In addition to such rules (or instead of such rules), an encoder can signal information to a decoder that indicates how the decoder should construct, modify, etc. its RPL(s) to match the RPL(s) used by the encoder. Typically, an RPL is constructed during encoding and decoding based upon available information about the RPL (e.g., available pictures in the RPS), modifications according to rules and/or modifications signaled in the bitstream.

In some implementations, for a current picture, an encoder or decoder determines a reference picture set ("RPS") that includes reference pictures in a decoded frame storage area such as a decoded picture buffer ("DPB"). The RPS is a description of the reference pictures used in the decoding process of the current and future coded pictures. Reference pictures included in the RPS are listed explicitly in the bitstream.

The encoder or decoder determines the RPS once per picture. For example, the decoder determines the RPS after decoding a slice header for a slice of the picture, using syntax elements signaled in the slice header. Reference pictures are identified with picture order count ("POC") values, parts thereof and/or other information signaled in the bitstream. The encoder or decoder determines groups of short-term reference pictures and long-term reference pictures that may be used in inter-picture prediction of the current picture (and that may be used in inter-picture prediction of one or more of the pictures following the current picture in decoding order). (The encoder or decoder also determines groups of reference pictures that may be used in inter-picture prediction of one or more of the pictures following the current picture in decoding order, but are not used for the current picture.) Collectively, the groups of reference pictures are the RPS for the current picture.

For a given slice of the current picture, the encoder or decoder creates one or more RPLs. The encoder or decoder creates a temporary version of an RPL (e.g., RPL 0 or RPL 1) by combining the groups of short-term reference pictures and long-term reference pictures that may be used in inter-picture prediction of the current picture. To construct the RPL according to rules of an "implicit" approach, the encoder or decoder can use the reference pictures in the temporary version of the RPL, or use only some of the reference pictures in the temporary version of the RPL (e.g., the first x pictures in the temporary version of the RPL). For the "implicit" approach, RPL modification information will not be signaled in the bitstream, and is not parsed from the bitstream. In an "explicit" approach, to construct the RPL, the encoder or decoder uses RPL modification information signaled in/parsed from the bitstream to select specific reference pictures from the temporary version of the RPL. Compared to the RPL that would be constructed by rules of the "implicit" approach, the RPL modification information can specify removal of one or more reference pictures, addition of one or more reference pictures and/or reordering of reference pictures in the RPL.

Alternatively, an encoder or decoder uses another approach to creating an RPL from reference pictures.

B. Conditional Signaling of RPL Modification Flags.

According to one aspect of the innovations described herein, an encoder conditionally signals a flag that indicates whether an RPL is modified according to syntax elements explicitly signaled in the bitstream. A corresponding decoder conditionally parses such a flag.

In some example implementations, the flag is ref_pic_list_modification_flag_l0 or ref_pic_list_modification_flag_l1 (generally, the flag is ref_pic_list_modification_flag_lX, where X can be 0 or 1). If the value of the flag ref_pic_list_modification_flag_lX is equal to 1, the RPL X is specified explicitly as a list of list_entry_lX[i] values (again, with X being 0 or 1). If the value of the flag ref_pic_list_modification_flag_lX is equal to 0, the RPL X is determined implicitly. When ref_pic_list_modification_flag_lX is not present, it is inferred to be equal to 0.

FIG. 7a shows example syntax (700) for a ref_pic_lists_modification( ) syntax structure in example implementations. The structure may be signaled as part of a slice header. In the example syntax (700), ref_pic_list_modification_flag_lX is only sent when NumPocTotalCurr is greater than 1. NumPocTotalCurr is a variable that indicates a total number of reference pictures applicable for current encoding or decoding. In example implementations of encoding or decoding, when the variable NumPocTotalCurr is derived for a slice of a current picture, the variable indicates the count of short-term reference pictures and long-term reference pictures used as reference pictures for encoding or decoding of the current picture.

As shown in FIG. 7a, the conditional signaling of ref_pic_list_modification_flag_lX depends on the value of the variable NumPocTotalCurr. When NumPocTotalCurr is less than or equal to 1, there is no possibility for modification of the RPL, and hence no need to send the flag ref_pic_list_modification_flag_lX. This conditional signaling can save one or two flags for every slice, when the condition is fulfilled. The modification in FIG. 7a includes the condition "if(NumPocTotalCurr>1)" for whether the flag ref_pic_list_modification_flag_lX is signaled. The condition can be checked for list 0 (for a P slice or B slice) and/or for list 1 (for a B slice).

Alternatively, the signaling and parsing of an RPL modification structure including one or more RPL modification flags (e.g., a ref_pic_lists_modification( ) structure) can be controlled by evaluating a condition as part of slice header processing or otherwise. FIG. 7b illustrates an approach to conditional signaling and parsing of flags ref_pic_list_modification_flag_l0 and ref_pic_list_modification_flag_l1 based on this condition. Specifically, FIG. 7b shows example syntax (750) for a slice header syntax structure that may include a ref_pic_lists_modification( ) syntax structure, which is depicted in the syntax (760) of FIG. 7c. For the example syntax (750) of the slice header, the flag lists_modification_present_flag is signaled in a picture parameter set that applies for the slice. When lists_modification_present_flag equals 0, the structure ref_pic_lists_modification( ) is not present in the slice header. When lists_modification_present_flag equals 1, the structure ref_pic_lists_modification( ) may be present in the slice header, depending on the value of the variable NumPocTotalCurr. If the variable NumPocTotalCurr is greater than 1, then the ref_pic_lists_modification( ) structure is signaled, as shown in the syntax (760) of FIG. 7c. Otherwise (the variable NumPocTotalCurr is not greater than 1), the ref_pic_lists_modification( ) structure is not signaled, and the values of list entries are inferred.

In FIGS. 7a-7c, 8 and 9, the term "u(n)" represents an unsigned integer using n bits. When n is "v" (as in "u(v)"), the number of bits varies in a manner dependent on the value of other syntax elements. The parsing process for u(n) can be specified by the return value of a function that reads n bits as a binary representation of an unsigned integer, with most significant bit written first.

C. Signaling of Syntax Elements for List Entries.

According to another aspect of the innovations described herein, an encoder conditionally signals syntax elements for list entries that indicate how to modify an RPL. A corresponding decoder conditionally parses such syntax elements.

In some example implementations, the syntax elements are for list_entry_l0[i] syntax elements for RPL 0 or list_entry_l1[i] syntax elements for RPL 1 (generally, the syntax element is list_entry_lX, where X can be 0 or 1). FIG. 8 shows example syntax (800) for a ref_pic_lists_modification( ) syntax structure, which may be signaled as part of a slice header. In the example syntax (800), the syntax element list_entry_lX[0] is conditionally signaled in the bitstream. In particular, when NumPocTotalCurr is equal to 2 and num_ref_idx_lX_active_minus1 is equal to 0, the syntax element list_entry_lX[0] is not signaled in the bitstream. The variable num_ref_idx_lX_active_minus1 indicates the maximum reference index for the RPL X that may be used to decode a slice. The num_ref idx_lX_active_minus1 variable can have a default value (e.g., a value from 0 . . . 15, as specified in the applicable picture parameter set), or num_ref idx_lX_active_minus1 can have a value signaled in a slice header for the current slice.

As shown in FIG. 8, even when ref_pic_list_modification_flag_lX indicates RPL modification information is signaled in the bitstream, the signaling of list_entry_lX[0] depends on NumPocTotalCurr and num_ref_idx_lX_active_minus1. When NumPocTotalCurr is equal to 2 and num_ref idx_lX_active_minus1 is equal to 1, the value of list_entry_lX[0] can be inferred based on ref_pic_list_modification_flag_lX, since there are only two choices possible (default value of 0 or the non-default value of 1).

Thus, FIG. 8 includes a condition for whether syntax elements for list entries are signaled. For RPL 0, the condition is "if (ref_pic_list_modification_flag_l0 && !(NumPocTotalCurr==2 && num_ref idx_l0_active_minus1==0))." For RPL 1, the condition is "if (ref_pic_list_modification_flag_l1 && !(NumPocTotalCurr==2 && num_ref idx_l1_active_minus1==0))."

In the example of FIG. 8, list_entry_l0[i] specifies the index of the reference picture in RefPicListTemp0 (a temporary version of RPL) to be placed at the current position of RPL 0. The length of the list_entry_l0[i] syntax element is Ceil(Log 2(NumPocTotalCurr)) bits. The value of list_entry_l0[i] is in the range of 0 to NumPocTotalCurr−1, inclusive. If NumPocTotalCurr is equal to 2 and num_ref_idx_l0_active_minus1 is equal to 0, the syntax element list_entry_l0[0] is inferred to be equal to ref_pic_list_modification_flag_l0. Otherwise, when the syntax element list_entry_l0[i] is not present, it is inferred to be equal to 0.

In the example of FIG. 8, list_entry_l1[i] specifies the index of the reference picture in RefPicListTemp1 (a temporary version of RPL) to be placed at the current position of RPL 1. The length of the list_entry_l1[i] syntax element is Ceil(Log 2(NumPocTotalCurr)) bits. The value of list_entry_l1[i] is in the range of 0 to NumPocTotalCurr−1, inclusive. If NumPocTotalCurr is equal to 2 and num_ref_idx_l1_active_minus1 is equal to 0, the syntax element list_entry_l1[0] is inferred to be equal to ref_pic_list_modification_flag_l1. Otherwise, when the syntax element list_entry_l1[i] is not present, it is inferred to be equal to 0.

FIG. 9 shows another example syntax (900) for a ref_pic_lists_modification( ) syntax structure, which may be signaled as part of a slice header. In the example syntax (900), the syntax element list_entry_lX[0] is conditionally signaled in the bitstream. Compared to the example syntax of FIG. 8, however, the condition that is checked is different. Also, the signaling of syntax elements for list_entry_lX[1] may be adjusted depending on whether weighted prediction is used.

According to FIG. 9, whether weighted prediction is enabled or disabled affects how syntax elements for list entries are signaled in the bitstream. For P slices with weighted_pred_flag equal to 0 or for B slices with weighted_bipred_flag equal to 0, weighted prediction is disabled. According to the example syntax (900) of FIG. 9, when weighted prediction is disabled, list_entry_lX[0] and list_entry_lX[1] are not be sent when NumPocTotalCurr is equal to 2 and num_ref_idx_lX_active_minus1 is equal to 1. In such a case, list_entry_lX[0] and list_entry_lX[1] are inferred to be 1 and 0, respectively, since RPL modification would not have been needed for the only other possibility (that is, list_entry_lX[0] and list_entry_lX[1] being equal to 0 and 1, respectively).

Thus, FIG. 9 includes a condition for whether syntax elements for list entries are signaled. For RPL 0, the condition is "if (ref_pic_list_modification_flag_l0 && !(NumPocTotalCurr==2 && num_ref_idx_l0_active_minus1==0) && !(NumPocTotalCurr==2 && num_ref_idx_l0_active_minus1==1 && ((weighted_pred_flag !=1 && slice_type==P)||(weighted_bipred_flag != 1 && slice_type==B))))." For RPL 1, the condition is "if (ref_pic_list_modification_flag_l1 && !(NumPocTotalCurr==2 && num_ref_idx_l1_active_minus1==0) && !(NumPocTotalCurr==2 && num_ref_idx_l1_active_minus1==1 && weighted_bipred_flag !=1))."

Furthermore, even in cases in which NumPocTotalCurr is not equal to 2 or num_ref_idx_lX_active_minus1 is not equal to 1, when weighted prediction is disabled (for P slices, weighted_pred_flag equal to 0; for B slices, weighted_bipred_flag equal to 0), the length of list_entry_lX[i] syntax element is limited to Ceil(Log 2(NumPocTotalCurr−i)) bits. In this case, it is only useful to place each reference picture once in the list, and thus the number of useful possibilities decreases as the index i increases.

In the example of FIG. 9, list_entry_l0[i] specifies the index of the reference picture in RefPicListTemp0 (a temporary version of RPL) to be placed at the current position of RPL 0. When weighted prediction is disabled (for P slices, weighted_pred_flag equal to 0; for B slices, weighted_bipred_flag equal to 0), the length of list_entry_l0[i] syntax element is Ceil(Log 2(NumPocTotalCurr−i)) bits. Otherwise, the length of the list_entry_l0[i] syntax element is Ceil(Log 2(NumPocTotalCurr)) bits. If NumPocTotalCurr is equal to 2 and num_ref_idx_l0_active_minus1 is equal to 0, the syntax element list_entry_l0[0] is inferred to be equal to ref_pic_list_modification_flag_l0 (as in the example of FIG. 8). Otherwise, if NumPocTotalCurr is equal to 2, num_ref_idx_l0_active_minus1 is equal to 1 and weighted prediction is disabled (when weighted_pred_flag is equal to 0 and the current slice is a P slice, or weighted_bipred_flag is equal to 0 and the current slice is a B slice), the syntax elements list_entry_l0[0] and list_entry_l0[1] are inferred to be equal to 1 and 0 respectively. Otherwise, when the syntax element list_entry_l0[i] is not present, it is inferred to be equal to 0.

If weighted prediction is disabled (when weighted_pred_flag is equal to 0 and the current slice is a P slice, or weighted_bipred_flag is equal to 0 and the current slice is a B slice) the value of list_entry_l0[i] is in the range of 0 to NumPocTotalCurr−(i+1), inclusive, and the list RefPicListTemp0 is shortened by removal of each entry list_entry_l0[i] from the list RefPicListTemp0 after the entry value is parsed. Otherwise, the value of list_entry_l0[i] is in the range of 0 to NumPocTotalCurr−1, inclusive.

In the example of FIG. 9, list_entry_l1[i] specifies the index of the reference picture in RefPicListTemp1 (a temporary version of RPL) to be placed at the current position of RPL 1. If weighted prediction is disabled (weighted_bipred_flag is equal to 0, since only a B slice uses list 1), the length of list_entry_l1[i] syntax element is Ceil(Log 2(NumPocTotalCurr−i)) bits. Otherwise, the length of the list_entry_l1[i] syntax element is Ceil(Log 2(NumPocTotalCurr)) bits. If NumPocTotalCurr is equal to 2 and num_ref_idx_l1_active_minus1 is equal to 0, the syntax element list_entry_l1[0] is inferred to be equal to ref_pic_list_modification_flag_l1 (as in the example of FIG. 8). Otherwise, if NumPocTotalCurr is equal to 2, num_ref_idx_l1_active_minus1 is equal to 1 and weighted prediction is disabled (weighted_bipred_flag is equal to 0—the current slice is a B slice), the syntax elements list_entry_l1[0] and list_entry_l1[1] are inferred to be equal to 1 and 0 respectively. Otherwise, when the syntax element list_entry_l1[i] is not present, it is inferred to be equal to 0.

If weighted prediction is disabled (weighted_bipred_flag is equal to 0—the current slice is a B slice), the value of list_entry_l1[i] is in the range of 0 to NumPocTotalCurr−(i+1), inclusive, and the list RefPicListTemp1 is shortened by removal of each entry list_entry_l1[i] from the list RefPicListTemp1 after the entry value is parsed. Otherwise, the value of list_entry_l0[i] is in the range of 0 to NumPocTotalCurr−1, inclusive.

D. Generalized Techniques for Conditional Signaling and Parsing of RPL Modification Flags.

Figure 10:
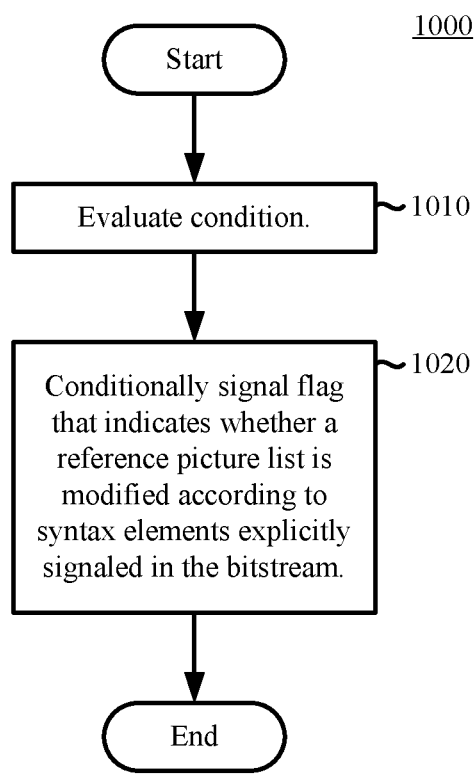
FIGS. 10 and 11 are flowcharts illustrating generalized techniques for conditional signaling and parsing, respectively, of a flag that indicates whether an RPL is modified.

FIG. 10 shows a generalized technique (1000) for conditional signaling of an RPL modification flag. A computing device that implements a video encoder, for example as described with reference to FIG. 3, can perform the technique (1000).

The device evaluates (1010) a condition. For example, the condition depends at least in part on a variable that indicates a number of total reference pictures. In some example implementations, the variable is NumPocTotalCurr, and the encoder checks whether the variable is greater than 1. Alternatively, the encoder evaluates other and/or additional conditions. The condition that is evaluated (1010) can include a single factor (e.g., value of variable that indicates a number of total reference pictures), or the condition that is evaluated (1010) can include multiple factors (e.g., value of variable that indicates a number of total reference pictures as well as one or more other factors). The condition can be evaluated (1010) as part of processing for an RPL modification structure. Or, the condition can be evaluated (1010) as part of processing for a slice header.

Depending on results of the evaluation, the device conditionally signals (1020) in a bitstream a flag that indicates whether an RPL is modified (e.g., replaced, adjusted) according to syntax elements explicitly signaled in the bitstream. For example, the flag is one of ref_pic_list_modification_flag_l0 or ref_pic_list_modification_flag_l1, and can be conditionally signaled as part of an RPL modification structure of a slice header. Or, after the condition is evaluated (1010), depending on the results of the evaluation, the RPL modification structure (including one or more flags that indicate whether an RPL is modified according to syntax elements explicitly signaled in the bitstream) is conditionally signaled in the bitstream.

The device can repeat the technique (1000) on a slice-by-slice basis when RPL modification structure is signaled, or on some other basis.

Figure 11:
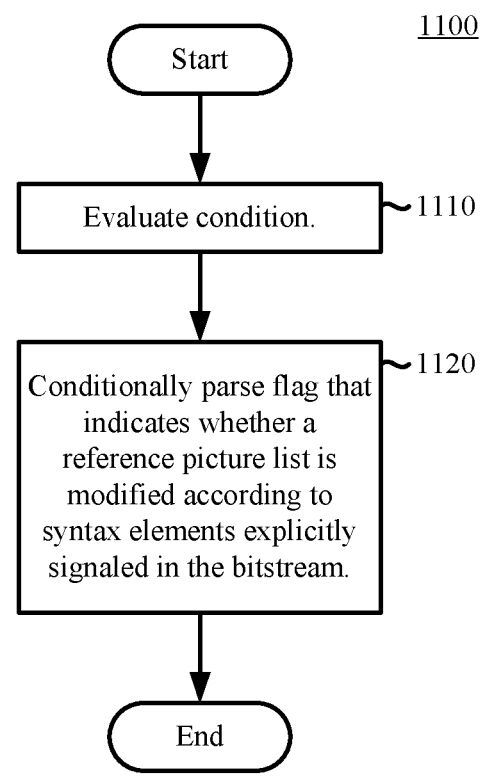

FIG. 11 shows a generalized technique (1100) for conditional parsing of an RPL modification flag. A computing device that implements a video decoder, for example as described with reference to FIG. 4, can perform the technique (1100).

The decoder evaluates (1110) a condition. For example, the condition depends at least in part on a variable that indicates a number of total reference pictures. In some example implementations, the variable is NumPocTotalCurr, and the decoder checks whether the variable is greater than 1. Alternatively, the decoder evaluates other and/or additional conditions. The condition that is evaluated (1110) can include a single factor (e.g., value of variable that indicates a number of total reference pictures), or the condition that is evaluated (1110) can include multiple factors (e.g., value of variable that indicates a number of total reference pictures as well as one or more other factors). The condition can be evaluated (1110) as part of processing for an RPL modification structure. Or, the condition can be evaluated (1110) as part of processing for a slice header.

Depending on results of the evaluation, the device conditionally parses (1120) from a bitstream a flag that indicates whether an RPL is modified (e.g., replaced, adjusted) according to syntax elements explicitly signaled in the bitstream. For example, the flag is one of ref_pic_list_modification_flag_l0 or ref_pic_list_modification_flag_l1, and can be conditionally signaled as part of an RPL modification structure of a slice header. Or, after the condition is evaluated (1110), depending on the results of the evaluation, the RPL modification structure (including one or more flags that indicate whether an RPL is modified according to syntax elements explicitly signaled in the bitstream) is conditionally parsed from the bitstream.

The device can repeat the technique (1100) on a slice-by-slice basis when RPL modification structure is signaled, or on some other basis.

E. Generalized Techniques for Conditional Signaling and Parsing of List Entries.

Figure 12:
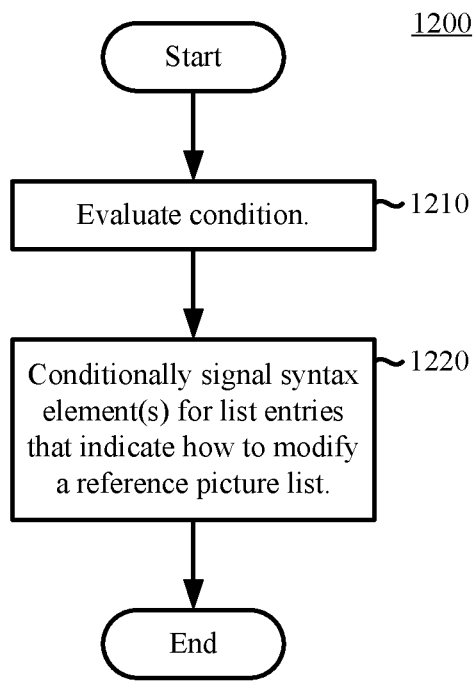
FIGS. 12 and 13 are flowcharts illustrating generalized techniques for conditional signaling and parsing, respectively, of syntax elements for list entries that indicate how to modify an RPL.

FIG. 12 shows a generalized technique (1200) for conditional signaling of list entries for RPL modification. A computing device that implements a video encoder, for example as described with reference to FIG. 3, can perform the technique (1200).

The device evaluates (1210) a condition. For example, the condition depends at least in part on a variable that indicates a number of total reference pictures (e.g., NumPocTotalCurr in some example implementations). Or, the condition depends at least in part on a number of active reference pictures for the RPL. Or, the condition depends at least in part on whether weighted prediction is disabled. Different logic can be used to check whether weighted prediction is disabled depending on whether a current slice is a P slice or B slice and/or depending on which RPL is being signaled/parsed. For example, the logic for checking the condition for a first RPL (which might be used by a P slice or B slice) is different than the logic for checking the condition for a second RPL (which can be used only by a B slice). Alternatively, the encoder evaluates other and/or additional conditions.

Depending on results of the evaluation, the device conditionally signals (1220) in a bitstream one or more syntax elements for list entries that indicate how to modify (e.g., replace, adjust) an RPL. For example, the syntax element(s) for list entries are conditionally signaled as part of an RPL modification structure of a slice header.

In some example implementations, if (a) the number of total reference pictures is equal to 2 and (b) the number of active reference pictures for the RPL is equal to 1, then the syntax element(s) for list entries are absent from the bitstream, and a value is inferred for one of the list entries. In other example implementations, in addition to this condition, if (c) the number of total reference pictures is equal to 2, (d) the number of active reference pictures for the RPL is equal to 2 and (e) weighted prediction is disabled, then the one or more syntax elements for list entries are absent from the bitstream, and values are inferred for two of the list entries.

The device can repeat the technique (1200) on a slice-by-slice basis when RPL modification structure is signaled, or on some other basis.

Figure 13:
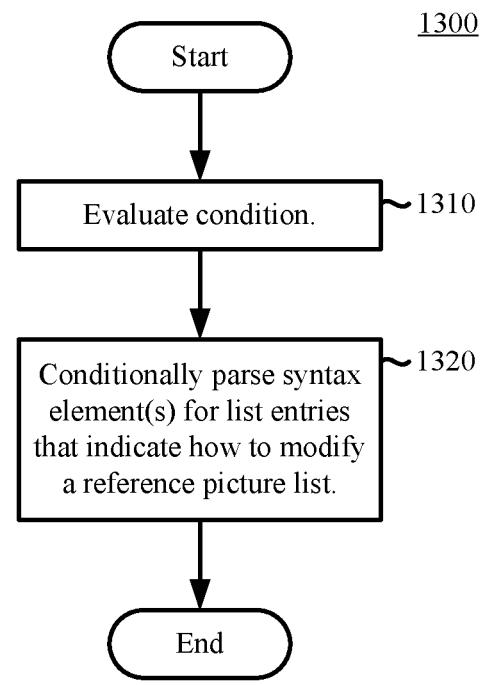

FIG. 13 shows a generalized technique (1300) for conditional parsing of list entries for RPL modification. A computing device that implements a video decoder, for example as described with reference to FIG. 4, can perform the technique (1300).

The decoder evaluates (1310) a condition. For example, the condition depends at least in part on a variable that indicates a number of total reference pictures (e.g., NumPocTotalCurr in some example implementations). Or, the condition depends at least in part on a number of active reference pictures for the RPL. Or, the condition depends at least in part on whether weighted prediction is disabled. Different logic can be used to check whether weighted prediction is disabled depending on whether a current slice is a P slice or B slice and/or depending on which RPL is being signaled/parsed. Alternatively, the decoder evaluates other and/or additional conditions.

Depending on results of the evaluation, the device conditionally parses (1320) from a bitstream one or more syntax elements for list entries that indicate how to modify (e.g., replace, adjust) an RPL. For example, the syntax element(s) for list entries are conditionally parsed from an RPL modification structure of a slice header.

In some example implementations, if (a) the number of total reference pictures is equal to 2 and (b) the number of active reference pictures for the RPL is equal to 1, then the syntax element(s) for list entries are absent from the bitstream, and a value is inferred for one of the list entries. In other example implementations, in addition to this condition, if (c) the number of total reference pictures is equal to 2, (d) the number of active reference pictures for the RPL is equal to 2 and (e) weighted prediction is disabled, then the one or more syntax elements for list entries are absent from the bitstream, and values are inferred for two of the list entries.

The device can repeat the technique (1300) on a slice-by-slice basis when RPL modification structure is signaled, or on some other basis.

F. Generalized Techniques for Adjusting Signaling and Parsing of List Entries.

Figure 14:
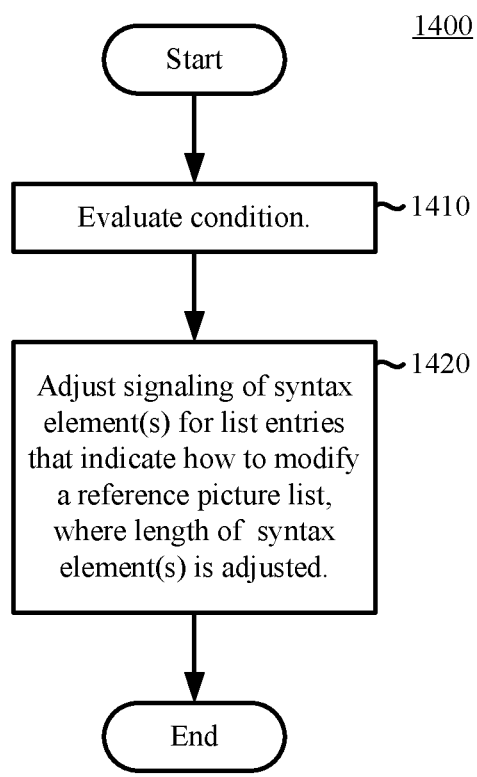
FIGS. 14 and 15 are flowcharts illustrating generalized techniques for adjusting signaling and parsing, respectively, of syntax elements for list entries that indicate how to modify an RPL.

FIG. 14 shows a generalized technique (1400) for adjusting signaling of list entries for RPL modification. A computing device that implements a video encoder, for example as described with reference to FIG. 3, can perform the technique (1400).

The device evaluates (1410) a condition. For example, the condition depends at least in part on whether weighted prediction is disabled. Different logic can be used to check whether weighted prediction is disabled depending on whether a current slice is a P slice or B slice and/or depending on which RPL is being signaled/parsed. For example, the logic for checking the condition for a first RPL (which might be used by a P slice or B slice) is different than the logic for checking the condition for a second RPL (which can be used only by a B slice). Alternatively, the encoder evaluates other and/or additional conditions.

Depending on results of the evaluation, the device adjusts (1420) signaling in a bitstream of one or more syntax elements for list entries that indicate how to modify (e.g., replace, adjust) an RPL. In particular, length (in bits) of at least one of the syntax element(s) is adjusted. For example, for an index i for the list entries, if weighted prediction is disabled, the length (in bits) of the at least one of the syntax elements decreases as i increases. In some example implementations, if weighted prediction is disabled, the length of a given syntax element for list entry[i] is Ceil(Log 2(NumPocTotalCurr−i)). Otherwise (weighted prediction is enabled), the length of the given syntax element for list entry[i] is Ceil(Log 2(NumPocTotalCurr)) bits.

The device can repeat the technique (1400) on a slice-by-slice basis when RPL modification structure is signaled, or on some other basis.

Figure 15:
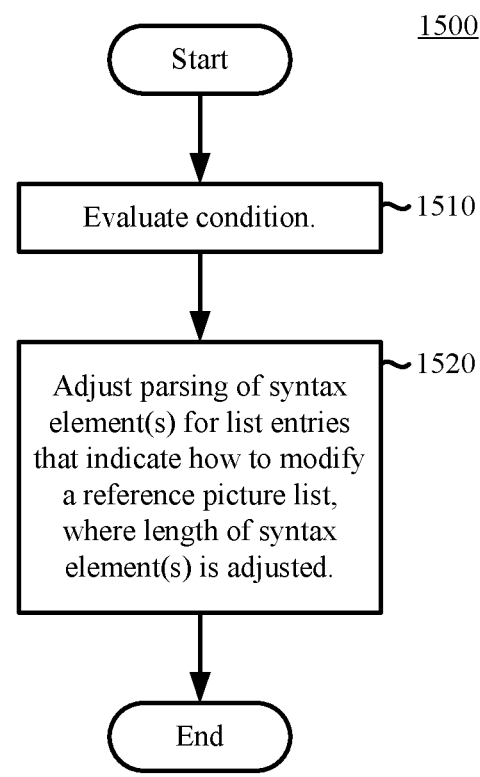

FIG. 15 shows a generalized technique (1500) for adjusting parsing of list entries for RPL modification. A computing device that implements a video decoder, for example as described with reference to FIG. 4, can perform the technique (1500).

The decoder evaluates (1510) a condition. For example, the condition depends at least in part on whether weighted prediction is disabled. Different logic can be used to check whether weighted prediction is disabled depending on whether a current slice is a P slice or B slice and/or depending on which RPL is being signaled/parsed. Alternatively, the decoder evaluates other and/or additional conditions.

Depending on results of the evaluation, the device adjusts (1520) parsing from a bitstream of one or more syntax elements for list entries that indicate how to modify (e.g., replace, adjust) an RPL. In particular, length (in bits) of at least one of the syntax element(s) is adjusted. For example, for an index i for the list entries, if weighted prediction is disabled, the length (in bits) of the at least one of the syntax elements decreases as i increases. In some example implementations, if weighted prediction is disabled, the length of a given syntax element for list entry[i] is Ceil(Log 2(NumPocTotalCurr−i)). Otherwise (weighted prediction is enabled), the length of the given syntax element for list entry[i] is Ceil(Log 2(NumPocTotalCurr)) bits.

The device can repeat the technique (1500) on a slice-by-slice basis when RPL modification structure is signaled, or on some other basis.

G. Alternatives.

FIGS. 7a, 7b, 10 and 11 illustrate conditional signaling and parsing of a flag such as ref_pic_list_modification_flag_l0 or ref_pic_list_modification_flag_l1 based on a condition. In this way, the signaling of additional RPL modification information (such as syntax elements for list entries) is controlled. As explained with reference to FIG. 7a, the signaling and parsing of an RPL modification flag can be controlled by evaluating the condition as part of a ref_pic_lists_modification( ) structure. Alternatively, as explained with reference to FIG. 7b, the signaling and parsing of the RPL modification structure (e.g., ref_pic_lists_modification( ) structure) can be controlled by evaluating the same condition as part of slice header processing or otherwise. For example, if the variable NumPocTotalCurr is greater than 1, then the ref_pic_lists_modification( ) structure is signaled. Otherwise (the variable NumPocTotalCurr is not greater than 1), the ref_pic_lists_modification( ) structure is not signaled, and the values of list entries are inferred as described above with reference to FIG. 7a. Extending FIG. 10, after the condition is evaluated, depending on results of the evaluation, the RPL modification syntax structure is conditionally signaled. Extending FIG. 11, after the condition is evaluated, depending on results of the evaluation, the RPL modification syntax structure is conditionally parsed.

For the sake of illustration, the detailed description includes various examples with specific names for some parameters and variables. The innovations described herein are not limited to implementations with parameters or variables having such names. Instead, the innovations described herein can be implemented with various types of parameters and variables.

H. Additional Innovative Features.

In addition to the claims, innovative features described herein include, but are not limited to, the features shown in the following table.

| # | Feature |
|---|---------|
| A. Conditional Signaling of Syntax Elements for List Entries of an RPL | |
| A1 | A method performed by a video encoder, comprising: evaluating a condition; and depending on results of the evaluating, conditionally signaling in a bitstream one or more syntax elements for list entries that indicate how to modify an RPL. |
| A2 | A method performed by a video decoder, comprising: evaluating a condition; and depending on results of the evaluating, conditionally parsing from a bitstream one or more syntax elements for list entries that indicate how to modify an RPL. |
| A3 | The method of feature A1 or A2 wherein the condition depends at least in part on a variable that indicates a number of total reference pictures. |
| A4 | The method of feature A3 wherein the variable is NumPocTotalCurr. |
| A5 | The method of any one of features A1-A4 wherein the condition depends at least in part on a number of active reference pictures for the RPL. |
| A6 | The method of any one of features A1-A5 wherein the condition depends at least in part on whether weighted prediction is disabled. |
| A7 | The method of feature A6 wherein different logic is used to check whether weighted prediction is disabled depending on whether a current slice is a P slice or B slice and/or depending on which RPL is being signaled/parsed. |
| A8 | The method of feature A1 or A2 wherein the condition depends at least in part on whether (a) a number of total reference pictures is equal to 2 and (b) a number of active reference pictures for the RPL is equal to 1. |

| # | Feature |
|---|---|
| A9 | The method of feature A8 wherein, if (a) the number of total reference pictures is equal to 2 and (b) the number of active reference pictures for the RPL is equal to 1, then the one or more syntax elements for list entries are absent from the bitstream, and a value is inferred for one of the list entries. |
| A10 | The method of feature A1 or A2 wherein the condition depends at least in part on whether (c) the number of total reference pictures is equal to 2, (d) the number of active reference pictures for the RPL is equal to 2 and (e) weighted prediction is disabled. |
| A11 | The method of feature A10 wherein if (c) the number of total reference pictures is equal to 2, (d) the number of active reference pictures for the RPL is equal to 2 and (e) weighted prediction is disabled, then the one or more syntax elements for list entries are absent from the bitstream, and values are inferred for two of the list entries. |
| A12 | The method of any one of features A1-A11 wherein the one or more syntax elements for list entries are conditionally signaled as part of an RPL modification structure of a slice header. |
| A13 | The method of any one of features A1-A12 wherein the RPL is an RPL 0 associated with a P slice. |
| A14 | The method of any one of features A1-A12 further comprising repeating the evaluating and the conditional signaling or parsing for each of multiple RPLs, wherein the multiple RPLs include an RPL 0 and RPL 1 associated with a B slice. |
| A15 | A computing device adapted to perform the method of any one of features A1-A14. |
| A16 | A tangible computer-readable media storing computer-executable instructions for causing a computing device to perform the method of any one of features A1-14. |
| | B. Adjusting Length of Syntax Elements for List Entries of an RPL |
| B1 | A method performed by a video encoder, comprising: evaluating a condition; and depending on results of the evaluating, adjusting signaling in a bitstream of one or more syntax elements for list entries that indicate how to modify an RPL, wherein length of at least one of the one or more syntax elements is adjusted. |
| B2 | A method performed by a video decoder, comprising: evaluating a condition; and depending on results of the evaluating, adjusting parsing from a bitstream of one or more syntax elements for list entries that indicate how to modify an RPL, wherein length of at least one of the one or more syntax elements is adjusted. |
| B3 | The method of feature B1 or B2 wherein the condition depends at least in part on whether weighted prediction is disabled. |
| B4 | The method of feature B3 wherein different logic is used to check whether weighted prediction is disabled depending on whether a current slice is a P slice or B slice and/or depending on which RPL is being signaled/parsed. |
| B5 | The method of feature B3 wherein for an index i for the list entries, if weighted prediction is disabled, the length of the at least one of the syntax elements decreases as i increases. |
| B6 | The method of feature B3 wherein, for an index i for the list entries: if weighted prediction is disabled, the length of a given syntax element for list entry[i] is Ceil(Log2(NumPocTotalCurr-i)) bits; and if weighted prediction is enabled, the length of the given syntax element for list entry[i] is Ceil(Log2(NumPocTotalCurr)) bits. |
| B7 | A computing device adapted to perform the method of any one of features B1-B6. |
| B8 | A tangible computer-readable media storing computer-executable instructions for causing a computing device to perform the method of any one of features B1-B6. |
| | C. General |
| C1 | A method performed by an encoder, comprising: encoding video; and outputting at least part of a bitstream including the encoded video, including signaling RPL information according to one of the innovations described herein. |
| C2 | A method performed by a decoder, comprising: receiving at least part of a bitstream including encoded video, including parsing RPL information signaled according to one of the innovations described herein; and decoding the encoded video. |
| C3 | A computing device adapted to perform the method of feature C1 or C2. |
| C4 | A tangible computer-readable media storing computer-executable instructions for causing a computing device to perform the method of feature C1 or C2. |

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A computer system comprising memory and one or more processing units, wherein the computer system implements a video decoder system that includes:
a buffer configured to receive encoded data in a bitstream; and
a video decoder configured to perform decoding of the encoded data, to produce reconstructed video, by operations comprising:
determining that a first condition is satisfied, wherein the first condition depends at least in part on a value of a reference picture list ("RPL") variable exceeding a first threshold amount;
responsive to the first condition being satisfied, parsing from the bitstream a flag that indicates whether additional RPL information is indicated in the bitstream;
determining, based on the flag, that the additional RPL information is indicated in the bitstream;
responsive to the determining that the additional RPL information is indicated in the bitstream, checking whether or not a second condition is satisfied, wherein the second condition depends at least in part on the value of the RPL variable exceeding a second threshold amount, the second threshold amount being greater than the first threshold amount; and
determining a value of an index that indicates an entry in an RPL structure, including, if the second condition is satisfied, parsing from the bitstream the value of the index, but otherwise, the second condition not being satisfied, inferring the value of the index.

2. The computer system of claim 1, wherein, when the second condition is satisfied, the value of the index has a number of bits that depends on the value of the RPL variable.

3. The computer system of claim 2, wherein the value of the index is in the range of 0 to the value of the RPL variable minus 1.

4. The computer system of claim 2, wherein the number of bits is log base 2 of the value of the RPL variable, rounded up to the nearest integer according to a ceiling function.

5. The computer system of claim 1, wherein the first threshold amount is one less than the second threshold amount.

6. The computer system of claim 1, wherein the operations are performed as part of processing of a slice header for a current slice.

7. The computer system of claim 1, wherein, when the second condition is not satisfied, the value of the index is inferred to be 0.

8. One or more computer-readable media having stored thereon encoded data in a bitstream, the one or more computer-readable media being selected from the group consisting of volatile memory, non-volatile memory, magnetic disk, CD-ROM, and DVD, the encoded data being organized to facilitate decoding of the encoded data, to produce reconstructed video, by operations comprising:
   determining that a first condition is satisfied, wherein the first condition depends at least in part on a value of a reference picture list ("RPL") variable exceeding a first threshold amount;
   responsive to the first condition being satisfied, parsing from the bitstream a flag that indicates whether additional RPL information is indicated in the bitstream;
   determining, based on the flag, that the additional RPL information is indicated in the bitstream;
   responsive to the determining that the additional RPL information is indicated in the bitstream, checking whether or not a second condition is satisfied, wherein the second condition depends at least in part on the value of the RPL variable exceeding a second threshold amount, the second threshold amount being greater than the first threshold amount; and
   determining a value of an index that indicates an entry in an RPL structure, including, if the second condition is satisfied, parsing from the bitstream the value of the index, but otherwise, the second condition not being satisfied, inferring the value of the index.

9. The one or more computer-readable media of claim 8, wherein, when the second condition is satisfied, the value of the index has a number of bits that depends on the value of the RPL variable.

10. The one or more computer-readable media of claim 9, wherein the value of the index is in the range of 0 to the value of the RPL variable minus 1, and wherein the number of bits is log base 2 of the value of the RPL variable, rounded up to the nearest integer according to a ceiling function.

11. The one or more computer-readable media of claim 8, wherein the first threshold amount is one less than the second threshold amount.

12. The one or more computer-readable media of claim 8, wherein the operations are performed as part of processing of a slice header for a current slice.

13. The one or more computer-readable media of claim 8, wherein, when the second condition is not satisfied, the value of the index is inferred to be 0.

14. In a computing device that implements a video encoder, a method comprising:
   receiving video; and
   encoding the video to produce encoded data in a bitstream, wherein the encoding the video includes:
      determining that a first condition is satisfied, wherein the first condition depends at least in part on a value of a reference picture list ("RPL") variable exceeding a first threshold amount;
      responsive to the first condition being satisfied, signaling in the bitstream a flag that indicates whether additional RPL information is indicated in the bitstream;
      determining, consistent with the flag, that the additional RPL information is indicated in the bitstream;
      responsive to the determining that the additional RPL information is indicated in the bitstream, checking whether or not a second condition is satisfied, wherein the second condition depends at least in part on the value of the RPL variable exceeding a second threshold amount, the second threshold amount being greater than the first threshold amount; and
      conditionally signaling in the bitstream a value of an index that indicates an entry in an RPL structure, including, if the second condition is satisfied, signaling in the bitstream the value of the index, but otherwise, the second condition not being satisfied, skipping the signaling in the bitstream the value of the index.

15. The method of claim 14, wherein, when the second condition is satisfied, the value of the index has a number of bits that depends on the value of the RPL variable.

16. The method of claim 15, wherein the value of the index is in the range of 0 to the value of the RPL variable minus 1.

17. The method of claim 15, wherein the number of bits is log base 2 of the value of the RPL variable, rounded up to the nearest integer according to a ceiling function.

18. The method of claim 14, wherein the first threshold amount is one less than the second threshold amount.

19. The method of claim 14, wherein the determining that the first condition is satisfied, the signaling the flag, the determining that the additional RPL information is indicated in the bitstream, the checking, and the conditionally signaling are performed as part of processing of a slice header for a current slice.

20. The method of claim 14, wherein, when the second condition is not satisfied, the value of the index is inferred to be 0.

* * * * *